(12) United States Patent
Huang et al.

(10) Patent No.: US 12,544,983 B2
(45) Date of Patent: Feb. 10, 2026

(54) DEVICE FOR 3D PRINTING AND CONTROL METHOD THEREOF

(71) Applicant: SUZHOU MEAMAN MACHINES CO., LTD, Suzhou (CN)

(72) Inventors: Weidong Huang, Suzhou (CN); Peng Huang, Suzhou (CN)

(73) Assignee: SUZHOU MEAMAN MACHINES CO., LTD., Suzhou (CN)

( * ) Notice: Subject to any disclaimer, the term of this patent is extended or adjusted under 35 U.S.C. 154(b) by 571 days.

(21) Appl. No.: 17/954,652

(22) Filed: Sep. 28, 2022

(65) Prior Publication Data
US 2023/0017560 A1   Jan. 19, 2023

Related U.S. Application Data

(63) Continuation of application No. PCT/CN2021/074434, filed on Jan. 29, 2021.

(30) Foreign Application Priority Data

Apr. 3, 2020 (CN) .......................... 202010261474.7

(51) Int. Cl.
*B29C 64/118* (2017.01)
*B29C 64/321* (2017.01)
(Continued)

(52) U.S. Cl.
CPC .......... *B29C 64/393* (2017.08); *B29C 64/118* (2017.08); *B29C 64/321* (2017.08); *B33Y 50/02* (2014.12)

(58) Field of Classification Search
CPC ... B29C 64/118; B29C 64/321; B29C 64/393; B33Y 50/02
See application file for complete search history.

(56) References Cited

U.S. PATENT DOCUMENTS 6,030,199 A     2/2000  Tseng
2016/0151833 A1  6/2016  Tsao
(Continued)

FOREIGN PATENT DOCUMENTS

CN    106426908 A     2/2017
CN    106660123 A  *  5/2017  ............. B28B 1/001
(Continued)

OTHER PUBLICATIONS

European Search Report issued in counterpart European Patent Application No. EP 21779974.1, dated Jul. 28, 2023.
(Continued)

*Primary Examiner* — Mark A Connolly
(74) *Attorney, Agent, or Firm* — Westbridge IP LLC

(57) ABSTRACT

Disclosed are a device for 3D printing and a control method thereof. The device includes: a feeding pipe, wherein an opening extending along an axial direction of the feeding pipe is disposed on an outer wall of the feeding pipe; a sleeve sleeved on the feeding pipe, wherein a discharge port in communication with the opening is disposed on an outer wall of the sleeve, the sleeve enables to rotate around an axis of the feeding pipe relative to the feeding pipe, to make the discharge port and the opening communicated or no longer communicated. Compared with conventional designs, the device utilizes a sleeve to provide a discharge port and sleeves the sleeve and the feeding pope together, thereby making the structure of the entire device more compact; moreover, printing suspension is realized by rotating the sleeve around the axis of the feeding pipe relative to the feeding pipe.

11 Claims, 16 Drawing Sheets

(51) Int. Cl.
   *B29C 64/393* (2017.01)
   *B33Y 50/02* (2015.01)

(56) References Cited

U.S. PATENT DOCUMENTS

| | | | |
|---|---|---|---|
| 2018/0354194 A1 | | 12/2018 | Huang |
| 2019/0232553 A1* | | 8/2019 | Lakshman ............ B29C 64/112 |

FOREIGN PATENT DOCUMENTS

| | | | | | |
|---|---|---|---|---|---|
| CN | 107042632 | A | | 8/2017 | |
| CN | 107175819 | A | | 9/2017 | |
| CN | 107599396 | A | * | 1/2018 | |
| CN | 107696470 | A | | 2/2018 | |
| CN | 108057890 | A | | 5/2018 | |
| CN | 108058382 | A | | 5/2018 | |
| CN | 208375962 | U | | 1/2019 | |
| CN | 209191312 | U | | 8/2019 | |
| CN | 111386187 | A | | 7/2020 | |
| EP | 3064193 | A1 | * | 9/2016 | ......... B29C 35/0805 |
| EP | 3117982 | A1 | * | 1/2017 | ........... B29C 64/329 |
| KR | 102088676 | B1 | * | 3/2020 | |
| WO | 2017113163 | A1 | | 7/2017 | |
| WO | 2020087359 | A1 | | 5/2020 | |

OTHER PUBLICATIONS

First Office Action issued in counterpart Chinese Patent Application No. 202010261474.7, dated Nov. 2, 2021.
International Search Report issued in corresponding PCT Application No. PCT/CN2021/074434, dated Apr. 27, 2021.
Second Office Action issued in counterpart Chinese Patent Application No. 202010261474.7, dated Jun. 6, 2022.
Written Opinion issued in corresponding PCT Application No. PCT/CN2021/074434, dated Apr. 27, 2021.

* cited by examiner

S2710 — controlling the sleeve to rotate around the axis of the feeding pipe relative to the feeding pipe, so as to make the discharge port and the opening be communicated or no longer communicated S2720 — adjusting a size of the discharge port

DEVICE FOR 3D PRINTING AND CONTROL METHOD THEREOF

CROSS-REFERENCE TO RELATED APPLICATIONS

This application is a continuation of International Application No. PCT/CN2021/074434, filed on Jan. 29, 2021, which claims priority to Chinese Patent Application No. 202010261474.7, filed on Apr. 3, 2020 and entitled "device for 3D printing and control method thereof". The disclosures of the above-mentioned applications are incorporated herein by reference in their entireties.

TECHNICAL FIELD

The present application relates to a field of three-dimensional (3D) printing, more particularly, to a device for 3D printing and a control method thereof.

BACKGROUND

Fused deposition modeling (FDM) technology is a common 3D printing technology. The FDM technology generally involves heating material to a fused state (or a semi-flow state), and extruding the fused material from a discharge port (or an extrusion port) of a 3D printing head, and the material is deposited layer by layer on a printing platform to form a 3D article.

The conventional 3D printing head has a feeding portion and a nozzle for forming a discharge port. The nozzle is typically mounted at a lower end of the feeding portion, resulting in a less compact structure of a device.

SUMMARY

The present application provides a device for 3D printing and a control method thereof, which can make the structure of the device more compact.

In a first aspect, provided is a device for 3D printing, including: a feeding pipe, wherein an opening extending along an axial direction of the feeding pipe is disposed on an outer wall of the feeding pipe; and a sleeve sleeved on the feeding pipe, wherein a discharge port in communication with the opening is disposed on an outer wall of the sleeve, the sleeve is capable of rotating around an axis of the feeding pipe relative to the feeding pipe, so as to make the discharge port and the opening communicated or no longer communicated.

In a second aspect, provided is a control method of a device for 3D printing, where the device for 3D printing includes: a feeding pipe, wherein an opening extending along an axial direction of the feeding pipe is disposed on an outer wall of the feeding pipe; and a sleeve sleeved on the feeding pipe, wherein a discharge port in communication with the opening is disposed on an outer wall of the sleeve, the sleeve is capable of rotating around an axis of the feeding pipe relative to the feeding pipe; and the control method includes: controlling the sleeve to rotate around the axis of the feeding pipe relative to the feeding pipe, so as to make the discharge port and the opening communicated or no longer communicated.

In a third aspect, provided is a computer readable storage medium having stored thereon instructions for performing the control method of the second aspect.

In a fourth aspect, provided is a computer program product including instructions for performing the control method of the second aspect.

In contrast to the conventional design (a nozzle is disposed at the bottom of a feeding portion), the present application utilizes a sleeve to provide a discharge port, by assembling the sleeve and the feeding pipe together, making the overall structure of a device more compact; in addition, printing suspension is realized by rotating a sleeve around an axis of a feeding pipe relative to the feeding pipe, which can achieve a quick response to the printing suspension.

DESCRIPTION OF EMBODIMENTS

For ease of understanding, a brief introduction to a conventional 3D printing device is first provided.

Figure 1:
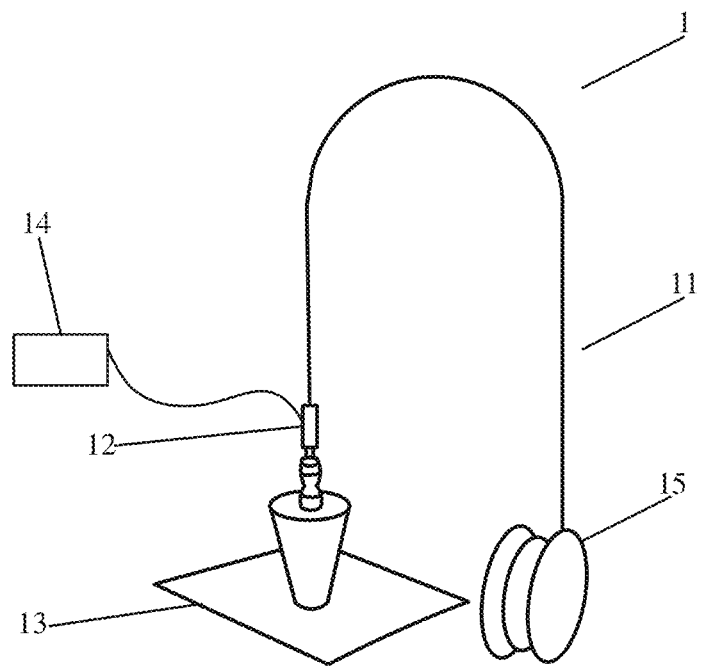
FIG. 1 is a schematic diagram of an overall structure of a conventional 3D printing device.

As shown in FIG. 1, a conventional 3D printing device 1 may generally include a feeding apparatus 11, a 3D printing head 12, a printing platform 13 and a control apparatus 14 (the above structure division manner is merely an example, and in fact, other structural division manners may also be adopted. For example, the control apparatus and/or the feeding apparatus 11 may belong to a part of the 3D printing head 12).

The feeding apparatus 11 may be connected to a scroll 15. In an actual printing process, the feeding apparatus 11 may take a filamentous material from the scroll 15, and convey the filamentous material to the 3D printing head 12. Material used in a 3D printing process is generally a thermoplastic material, such as a high-molecular polymer, a low-melting-point metal, or other materials that can be formulated as flowable pastes (such as paste-like ceramic, high-melting-point metal powder mixtures, cement or the like).

Figure 2:
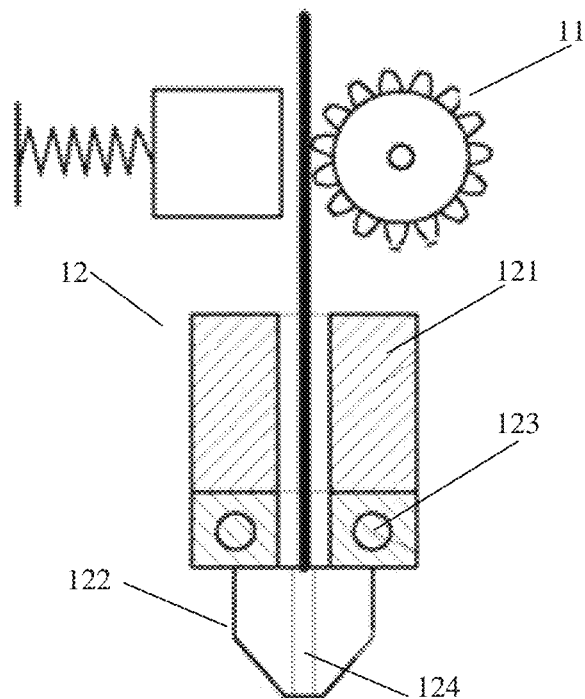
FIG. 2 is a schematic diagram of a structure of a conventional 3D printing head.

As shown in FIG. 2, the 3D printing head 12 may generally include a feeding portion 121, a nozzle 122 and a temperature control apparatus 123. The temperature control apparatus 123 is generally disposed outside the feeding portion 121 and configured to heat material conveyed by the feeding apparatus 11 to the feeding portion 121 to a molten state. The temperature control apparatus 123 may be, for example, a heating apparatus. The nozzle 122 is mounted at the lower end of the feeding portion 121. The nozzle may provide a discharge port 124, and thus may extrude the material in a molten state conveyed by the feeding portion 121 onto the printing platform 13.

The control apparatus 14 may be configured to control the 3D printing head 12 to print an article layer by layer. During a process of printing each layer, the 3D printing head 12 may be controlled to completely print all of a printing region of a layer to be printed (that is, the whole region enclosed by a cross-sectional contour line of the layer to be printed) according to a preset printing path.

An overall process of conventional 3D printing is generally as follows.

Before an article is printed, a 3D model of the article may be created by using modeling software. The modeling software may be, for example, computer aided design (computer aided design, CAD) software. Then, a layer processing is performed on the created 3D model, so as to divide the 3D model into multiple layers to be printed and obtain layer data of each layer to be printed. The layer processing of a 3D model is considered as decomposing a 3D article printing process into many 2D printing processes, and the printing process of each layer to be printed is similar to a planar 2D printing process. After obtaining the layer data of each layer to be printed, the control apparatus 14 may control the 3D printing head 12 to move along a certain filling path according to the layer data of each layer to be printed, and in a process of movement, the material in a molten state is extruded onto the printing platform 13 through the discharge port 124 to print or fill a printing region of each layer to be printed. After all layers to be printed of the article are printed, the material is solidified layer by layer to form a 3D article.

For ease of understanding, a printing process of a certain layer to be printed by the conventional 3D printing device will be described in detail below by taking FIG. 3a and FIG. 3b as examples.

Figure 3A:
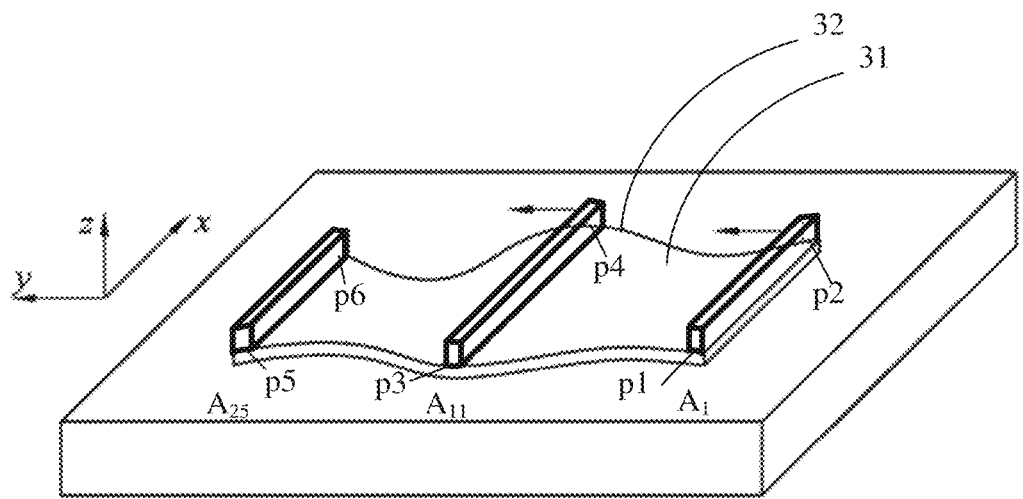
FIG. 3a is an exemplary diagram of a printing region of a layer to be printed.
Figure 3B:
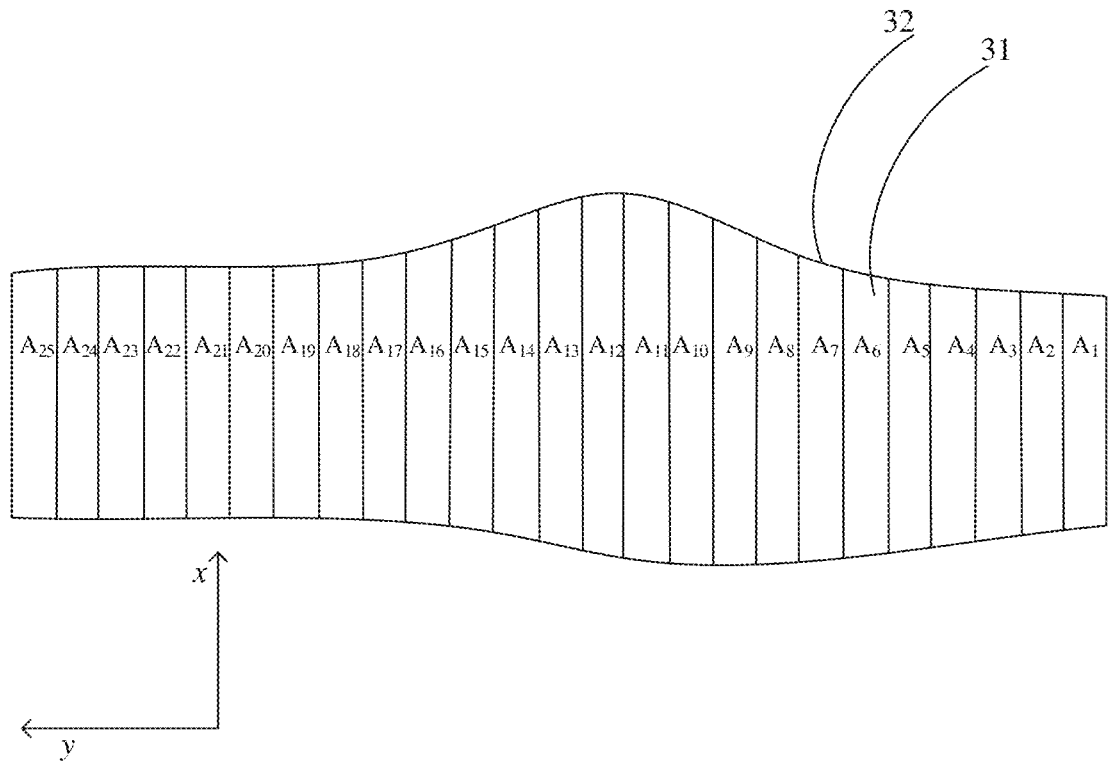
FIG. 3b is an exemplary diagram of an arrangement manner of passes.

Referring to FIG. 3a and FIG. 3b, a printing region of a layer to be printed is region 31, and a cross-sectional contour line of the region 31 is cross-sectional contour line 32.

In order to completely print the region 31, the region 31 is generally divided into a plurality of closely arranged passes based on the cross-sectional contour line 32, such as pass $A_1$ to pass $A_{25}$ shown in FIG. 3b.

In a process of printing, the control apparatus 14 controls a z-coordinate of the 3D printing head 12 to be unchanged, and controls the 3D printing head 12 to completely print all passes in a certain order, for example, printing the passes $A_1$-$A_{25}$ in sequence along a straight path in a parallel reciprocation manner.

For example, in a case of a printing process of pass $A_1$, the control apparatus 14 may first move the 3D printing head 12 to a position above position point p1 shown in FIG. 3a, and then control the 3D printing head 12 to move from the position above the position point p1 to a position above position point p2. During a movement process, material in a molten state is extruded onto the pass $A_1$ through the discharge port 124, so as to print the pass $A_1$. A printing manner of other passes is similar, and will not be described redundantly herein. After all the passes are printed, a printing process of the layer to be printed is completed, and the 3D printing head 12 or the work platform 13 may be controlled to move along the z-axis direction to prepare printing of a next layer.

As previously described, the conventional 3D printing head 12 has a feeding portion 121 and a nozzle 122 for providing a discharge port 124. The nozzle 122 is typically mounted at the lower end of the feeding portion 121, resulting in a less compact structure of the 3D printing head 12.

A device for 3D printing provided by an embodiment of the present application will be described in detail below. It should be noted that the device for 3D printing may refer to a 3D printing head, and may also refer to an entire 3D printer or a 3D printing system.

Figure 4:
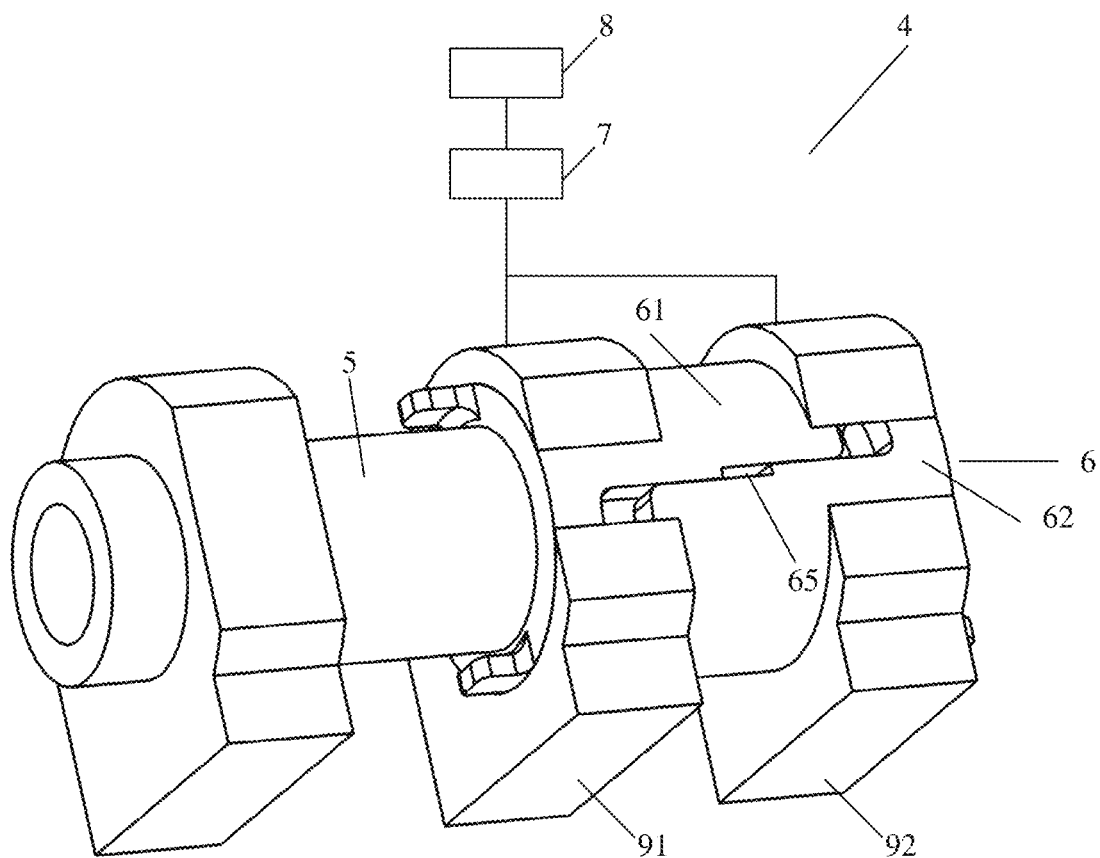
FIG. 4 is an exemplary diagram of a structure of a device for 3D printing provided by an embodiment of the present application.

As shown in FIG. 4, a device 4 for 3D printing may include a feeding pipe 5 and a sleeve 6. The sleeve 6 may be sleeved on the feeding pipe 5 to form a sleeve joint assembly that is compact in structure.

Figure 5:
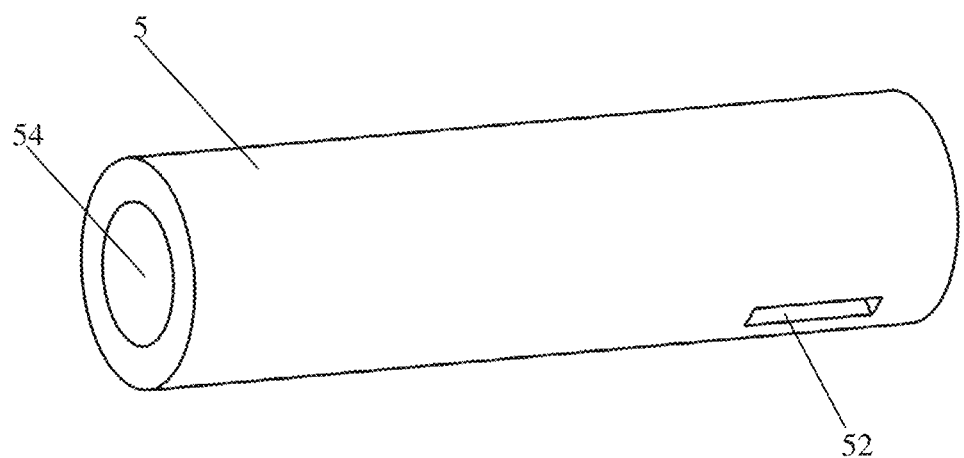
FIG. 5 is an exemplary diagram of a three dimensional structure of a feeding pipe provided by an embodiment of the present application.
Figure 6:
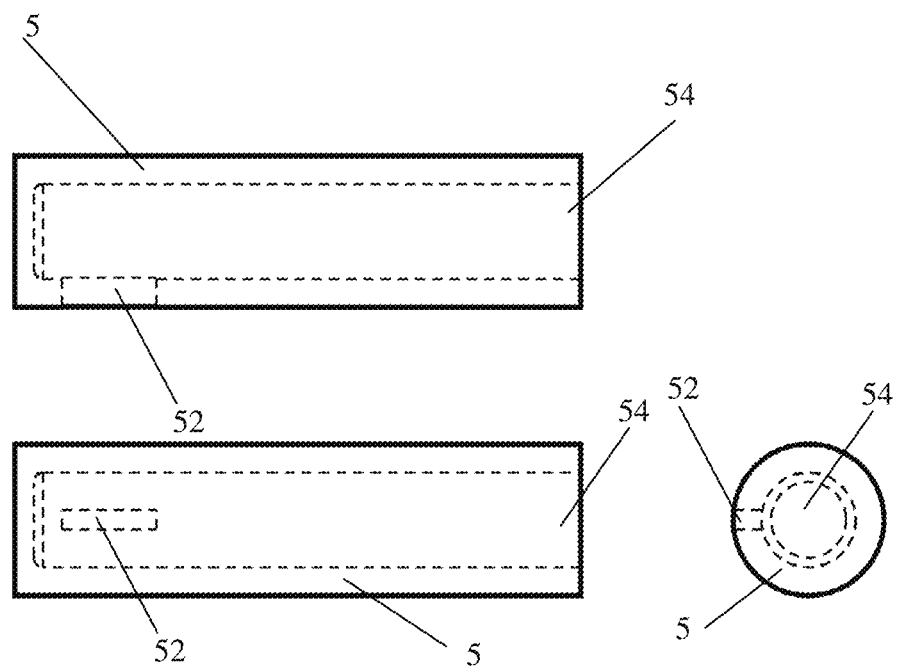
FIG. 6 is a two-dimensional plan view of the feeding pipe shown in FIG. 5.

Referring to FIG. 5 to FIG. 6, an opening 52 is disposed on an outer wall of the feeding pipe 5 (the opening may extend, for example, along an axial direction of the feeding pipe 5).

In some embodiments, the feeding pipe 5 may belong to one of the entire feeding portion of the device 4. In addition to the feeding pipe 5, the feeding portion may also include other portions in communication with the feeding pipe 5.

In other embodiments, the feeding pipe 5 is a feeding portion of the device 4, and a feed port 54 may be disposed on an end surface of the feeding pipe 5 or on the outer wall of the feeding pipe 5.

An interior of the feeding pipe 5 (hereinafter referred to as a feeding passage) may be of an arc design. For example, referring to FIG. 5 to FIG. 6, the feeding passage may be designed as a cylindrical passage. Moreover, in some embodiments, an arc transition is also adopted between the cylindrical passage and its ends. The feeding passage adopts an arc design, which not only enables a molten material to be smoothly conveyed in the feeding passage, but also facilitates the cleaning of the feeding passage, and avoids material waste due to retention in the interior of the feeding passage as much as possible.

The sleeve 6 may be sleeved on the feeding pipe 5, that is, the feeding pipe 5 may be seen as an inner pipe of the sleeve 6. A discharge port 65 that may be in communication with the opening 52 is disposed on the outer wall of the sleeve 6. In some embodiments, similar to the opening 52, the discharge port 65 may also extend along the axial direction of the feeding pipe 5, that is, a length direction of the discharge port 65 may be the axial direction of the feeding pipe 5. The outer wall of the sleeve 6 may be provided with one discharge port 65, or may be provided with a plurality of discharge ports 65. For example, the outer wall of the sleeve 6 may be provided with two discharge ports, three discharge ports, four discharge ports, and eight discharge ports. The sleeve 6 is movable relative to the feeding pipe 5 such that the opening 52 is capable of being in communication with different discharge ports 65 (that is, realizing a switch between the different discharge ports 65).

The sleeve 6 is capable of rotating around an axis of the feeding pipe 5 relative to the feeding pipe, so as to make the discharge port 65 and the opening 52 communicated or no longer communicated.

For example, the sleeve 6 is capable of rotating around the axis of the feeding pipe 5 relative to the feeding pipe, so as to make the discharge port 65 no longer be in communication with the opening 52 when printing is required to be suspended to block a material conveying passage, thus realizing printing suspension.

Figure 7:
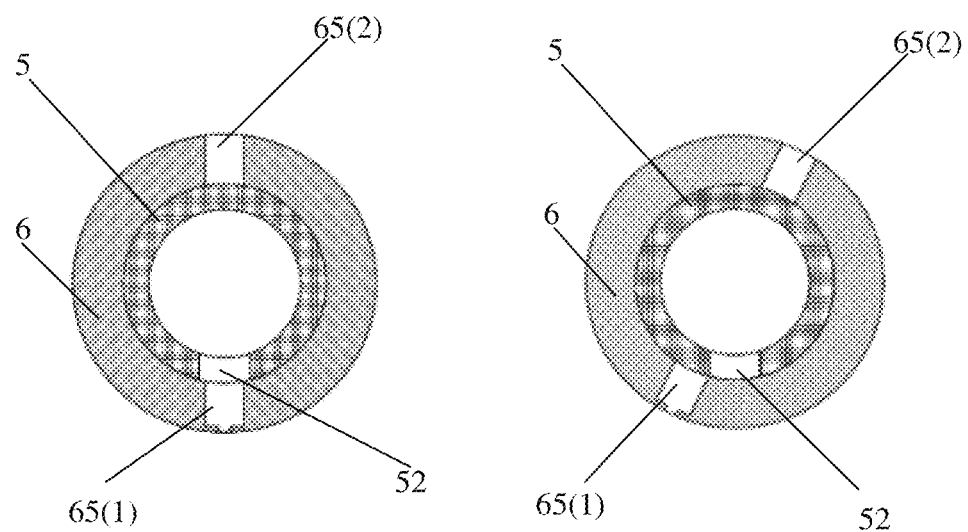
FIG. 7 is a cross section view of a feeding pipe and a sleeve in a direction through an extrusion passage of a discharge port provided by an embodiment of the present application.

An example will be described in conjunction with FIG. 7. Two discharge ports 65 are shown schematically in FIG. 7. In order to distinguish rather than limit, the two discharge ports are recorded as discharge port 65(1) and discharge port 65(2) respectively. Assuming that the discharge port 65(1) is initially in communication with the opening 52, as shown on the left in FIG. 7, the discharge port 65(1) is in communication with the opening 52, the sleeve 6 may rotate an angle around the axis of the feeding pipe 5 relative to the feeding pipe (rotating an angle clockwise in the example in FIG. 7), so as to make the discharge port 65(1) no longer be in communication with the opening 52, as shown on the right in FIG. 7, to block the material conveying passage, thus realizing printing suspension.

Therefore, the device 4 provided by an embodiment of the present application can realize printing suspension by rotating the sleeve around the axis of the feeding pipe relative to the feeding pipe, which can achieve a quick response to the printing suspension.

For example, the sleeve 6 may be capable of rotating a relatively small angle around the axis of the feeding pipe 5 relative to the feeding pipe, so as to make the discharge port 65 and the opening 52 communicated or no longer communicated. For example, the relatively small angle refers to a smallest angle that can make the discharge port 65 communicated with the opening 52 to no longer communicated, which is called first angle.

As an example, when printing is required to be suspended, assuming that a first angle of the sleeve 6 minimum rotating around the axis of the feeding pipe 5 relative to the feeding pipe can make the discharge port 65 no longer be in communication with the opening 52, then the sleeve 6 may rotate the first angle around the axis of the feeding pipe 5 relative to the feeding pipe to make the discharge port 65 no longer be in communication with the opening 52.

In this example, when printing is required to be started later, the sleeve 6 may reverse rotate the first angle around the axis of the feeding pipe 5 relative to the feeding pipe to make the discharge port 65 be in communication with the opening 52, thus resuming printing quickly.

It is often necessary to suspend the printing process during 3D printing. For example, it is necessary to suspend printing process when printing to contour edge of a target printing region, and wait until the printing head is moved to a new printing starting point before continuing the printing process. A 3D printing extrusion material is usually a high viscosity substance, for example, with a viscoelastic property of a polymer material. When a material conveying apparatus stops conveying the printing material, flow of the material will not stop suddenly, then the printing material will continue to accumulate outside the contour edge of the target printing area, which will destroy a shape of the cross-sectional contour line of the target printing area, resulting in reduced geometric accuracy of the printing article.

The device 4 provided by an embodiment of the present application, during 3D printing, when printing reaches the contour edge of the target printing area and is required to be suspended, the sleeve 6 may rotate a relative small angle around the axis of the feeding pipe 5 relative to the feeding pipe when the material conveying apparatus stops conveying the printing material, so as to make the discharge port 65 no longer be in communication with the opening 52 to block the material conveying passage, such that the printing material can quickly respond to an instruction of a control system and stop outflowing from the discharge port 65.

Therefore, the device 4 provided by an embodiment of the present application can realize a quick response to printing suspension.

In some embodiments, the sleeve 6 may rotate around the axis of the feeding pipe 5 relative to the feeding pipe when printing is required to be started, so as to make the discharge port 65 be in communication with the opening 52 to open the material conveying passage and realize printing starting.

An example will be described in conjunction with FIG. 7 again. Assuming that the discharge port 65(1) is not initially in communication with the opening 52, as shown on the right in FIG. 7, the sleeve 6 may rotate an angle around the axis of the feeding pipe 5 relative to the feeding pipe (rotating an angle anticlockwise in the example in FIG. 7), so as to make the discharge port 65(1) be in communication with the opening 52, as shown on the left in FIG. 7, to open the material conveying passage, thus realizing printing starting.

The device 4 provided by an embodiment of the present application can realize printing starting by rotating the sleeve 6 around the axis of the feeding pipe 5 relative to the feeding pipe, which can achieve a quick response to the printing starting.

A rotation of the sleeve 6 around the axis of the feeding pipe 5 relative to the feeding pipe may be achieved by means of a drive apparatus. As shown in FIG. 4, the device 4 may include a drive apparatus 7.

The drive apparatus 7 may be configured to drive the sleeve 6 to rotate around the axis of the feeding pipe 5 relative to the feeding pipe, so as to make the discharge port 65 and the opening 52 communicated or no longer communicated.

For example, the drive apparatus 7 may be configured to drive the sleeve 6 to rotate around the axis of the feeding pipe 5 relative to the feeding pipe when printing is required to be suspended, so as to make the discharge port 65 no longer be in communication with the opening 52.

For another example, the drive apparatus 7 may be configured to drive the sleeve 6 to rotate around the axis of the feeding pipe 5 relative to the feeding pipe when printing is required to be started, so as to make the discharge port 65 be in communication with the opening 52.

The drive apparatus 7 may be specifically implemented in a variety of manners, which is not limited in the embodiment of the present application, and may be, for example, a rack and pinion mechanism or a crank slider mechanism.

In some embodiments, the discharge port 65 may always be in communication with the opening 52. For example, the discharge port 65 may be fixed below the opening 52. The sleeve 6 may rotate around the axis of the feeding pipe 5 relative to the feeding pipe when printing is required to be suspended, so as to make the discharge port 65 no longer be in communication with the opening 52.

In some embodiments, the sleeve 6 may be movable relative to the feeding pipe 5 such that the discharge port 65 may move below the opening 52 to be in communication with the opening 52. The sleeve 6 may rotate around the axis of the feeding pipe 5 relative to the feeding pipe when printing is required to be suspended, so as to make the discharge port 65 no longer be in communication with the opening 52.

In some embodiments, the sleeve 6 may be a one-piece sleeve, such as an integrally formed sleeve. In other embodiments, the sleeve 6 may be a separate sleeve, that is, an outer wall of the sleeve 6 may include a plurality of separable portions, or an outer wall of the sleeve 6 may be spliced from a plurality of separable portions.

Figure 8:
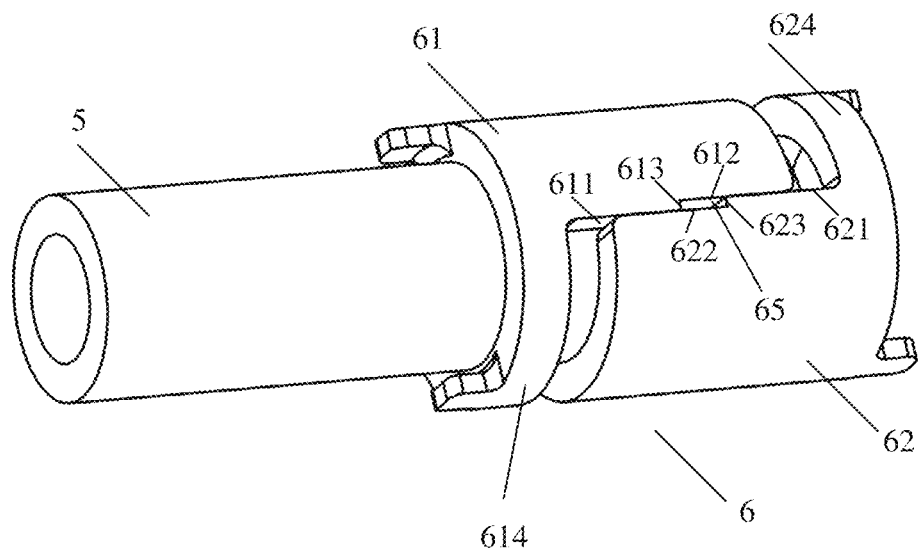
FIG. 8 is a structural view of the device shown in FIG. 4 after supports are removed.
Figure 9:
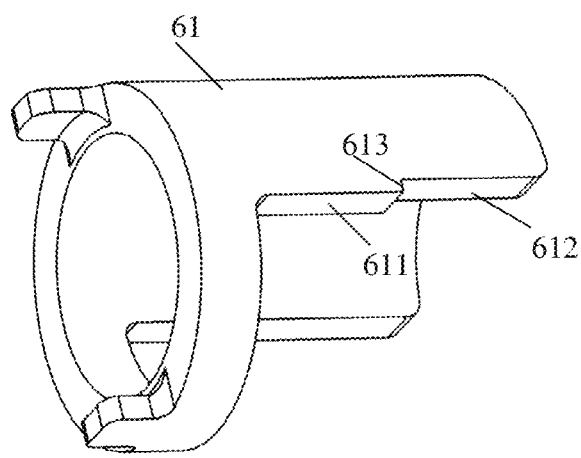
FIG. 9 is an exemplary diagram of a three dimensional structure of a separable portion of a separable sleeve provided by an embodiment of the present application.
Figure 10:
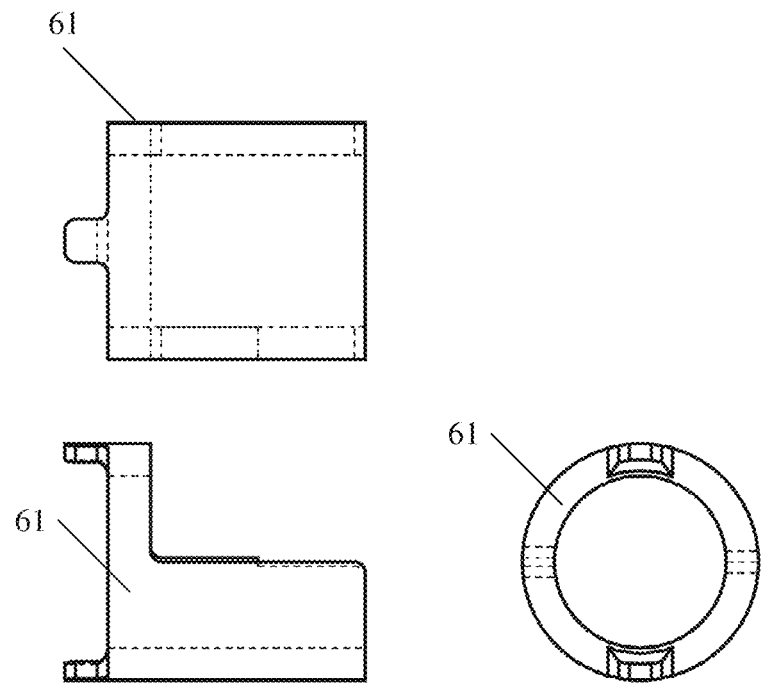
FIG. 10 is a two-dimensional plan view of the separable portion shown in FIG. 9.
Figure 11:
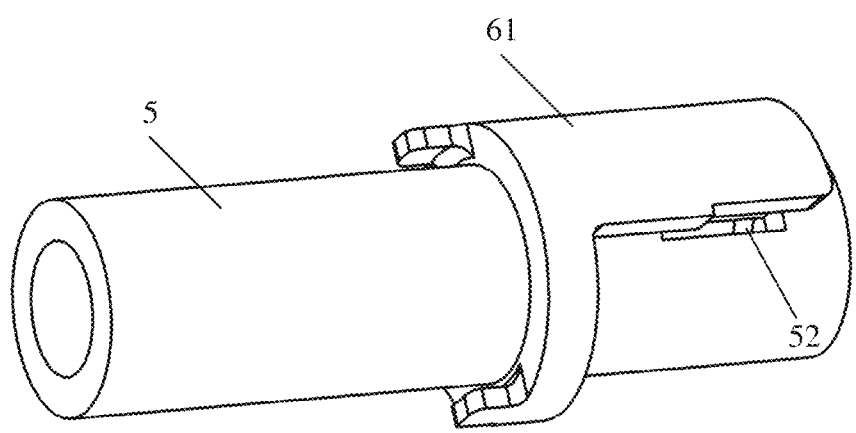
FIG. 11 is a schematic diagram of a manner in which the separable portion shown in FIG. 9 and a feeding pipe are assembled.

As shown in FIG. 8-10, the outer wall of the sleeve 6 may include a first portion 61 and a second portion 62 that are separable. The first portion 61 may be assembled with the feeding pipe 5 in the manner shown in FIG. 11. The second portion 62 may have a complementary structure to the first portion 61, and the two are spliced together in the manner shown in FIG. 8 to form the outer wall of the sleeve 6.

In some embodiments, the outer wall of the sleeve 6 may also be assembled from three or more separable portions. For example, in FIGS. 12 to 13, the outer wall of the sleeve 6 includes a first portion 61, a second portion 62, a third portion 63 and a fourth portion 64 that are separable, edges of which are spliced to each other to form the outer wall of the sleeve 6.

The sleeve 6 may be fixed to the feeding pipe 5 or movable relative to the feeding pipe 5. For example, the sleeve 6 may move along an axial direction of the feeding pipe 5; for another example, the sleeve 6 may rotate around an axis of the feeding pipe 5; and for yet another example, the sleeve 6 may not only move along an axial direction of the feeding pipe 5, but also rotate around an axis of the feeding pipe 5.

The discharge port 65 may be a discharge port with a fixed size or a discharge port with an adjustable size. The adjustable size of the discharge port 65 may refer that a length of the discharge port 65 is adjustable (or the length is continuously adjustable), or a width of the discharge port 65 is adjustable (or the width is continuously adjusted), or both length and width of the discharge port 65 are adjustable (or continuously adjustable).

The discharge port 65 may be designed as a discharge port with an adjustable size in a variety of manners. Several possible implementation manners are given below.

For example, as one possible implementation manner, one or more shutters may be provided at the discharge port 65 to adjust the size of the discharge port 65.

For another example, as another possible implementation manner, the sleeve 6 may include a plurality of separable portions. Abutting faces of the plurality of portions may form a plurality of discharge ports, and the plurality of portions may be movable relative to each other (e.g., moveable along the axial direction of the feeding pipe 5) to adjust the size of the discharge port 65.

For example, in FIG. 8, the sleeve 6 may include a first portion 61 and a second portion 62. The first portion 61 and the second portion 62 are slidable relative to each other along the axial direction of the feeding pipe 5 so as to form the discharge port 65 with an adjustable (or continuously adjustable) length.

Shapes of the first portion 61 and the second portion 62 and manners in which they form the discharge port 65 may be various.

As an example, as shown in FIG. 8, the first portion 61 may include a first upper stepped surface 611, a first lower stepped surface 612 and a first connecting surface 613 connecting the first upper stepped surface 611 and the first lower stepped surface 612. The second portion 62 may include a second upper stepped surface 621, a second lower stepped surface 622 and a second connecting surface 623 connecting the second upper stepped surface 621 and the second lower stepped surface 622. The first upper stepped surface 611 is in contact with the second lower stepped surface 622, and the two are slidable relative to each other along the axial direction of the feeding pipe 5 (in other words, the first upper stepped surface 611 and the second lower stepped surface 622 are in slidable connection along the axial direction of the feeding pipe 5). The first lower stepped surface 612 is in contact with the second upper stepped surface 621, and the two are slidable relative to each other along the axial direction of the feeding pipe 5 (in other words, the first lower stepped surface 612 and the second upper stepped surface 621 are in slidable connection along the axial direction of the feeding pipe 5). A hollow area formed by the first lower stepped surface 612, the first connecting surface 613, the second lower stepped surface 622 and the second connecting surface 623 may thus serve as the discharge port 65.

In this example, the first portion 61 and the second portion 62 are abutted together using a staggered complementary stepped structure, and the two are slidable relative to each other along the axial direction of the feeding pipe 5 to form the discharge port 65 with a continuously adjustable length. The width of the discharge port 65 depends on a difference in height between the first upper stepped surface 611 and the first lower stepped surface 612 (or the second upper stepped surface 621 and the second lower stepped surface 622). The implementation manner of such a discharge port can form a discharge port 65 having a small width on the premise of ensuring the size and strength of the first portion 61 and the second portion 62 (the width of the discharge port can affect printing accuracy).

As another example, the first portion 61 and the second portion 62 may have a concave-convex complementary structure. The relative sliding of the first portion 61 and the second portion 62 along the axial direction of the feeding pipe 5 may change a relative positional relationship between concave-convex portions, and a hollow area between the concave-convex portions may thus form the discharge port 65.

The above indicates that the first portion 61 and the second portion 62 are slidable relative to each other along the axial direction of the feeding pipe 5. It should be noted that not both the first portion 61 and the second portion 62 are required to be slidable relative to the feeding pipe 5 in the embodiment of the present application.

As one possible implementation manner, both the first portion 61 and the second portion 62 are slidable relative to the feeding pipe 5.

Figure 14:
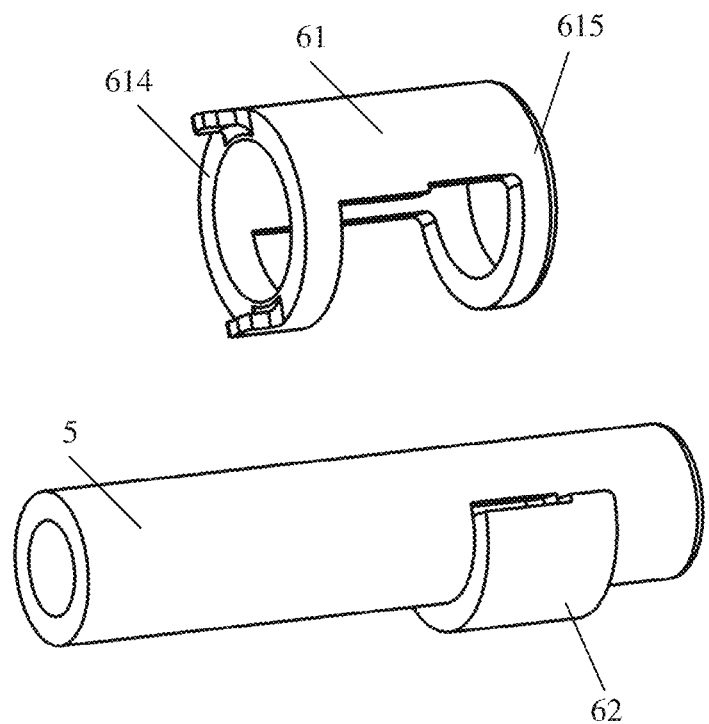
FIG. 14 is an exploded view of various separable portions of a separable sleeve provided by another embodiment of the present application.
Figure 15:
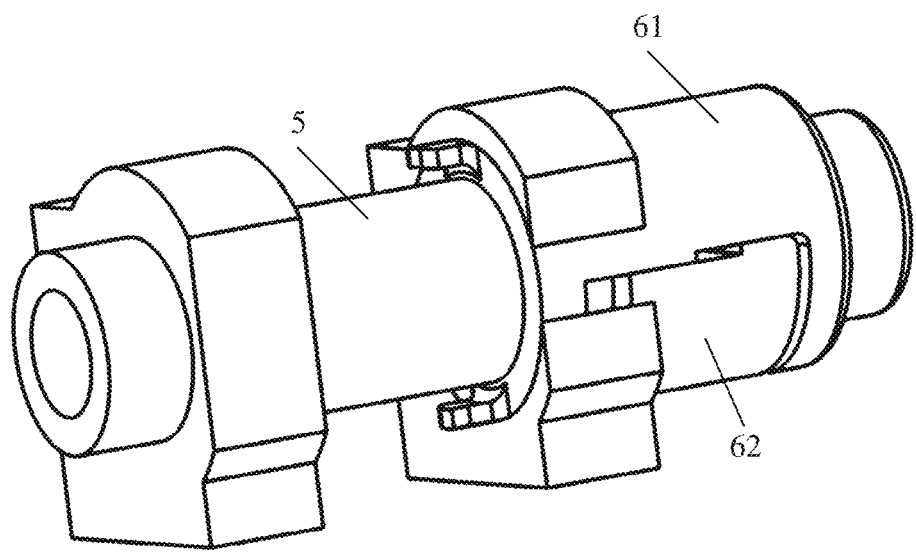
FIG. 15 is an assembled view of the separable sleeve shown in FIG. 14 and a feeding pipe.

As another possible implementation manner, as shown in FIGS. 14 to 15, the first portion 61 is slidable relative to the feeding pipe 5, and the second portion 62 is fixedly connected to the feeding pipe 5 or integrally formed with the feeding pipe 5. This implementation manner can simplify the control of the device 4.

Figure 16:
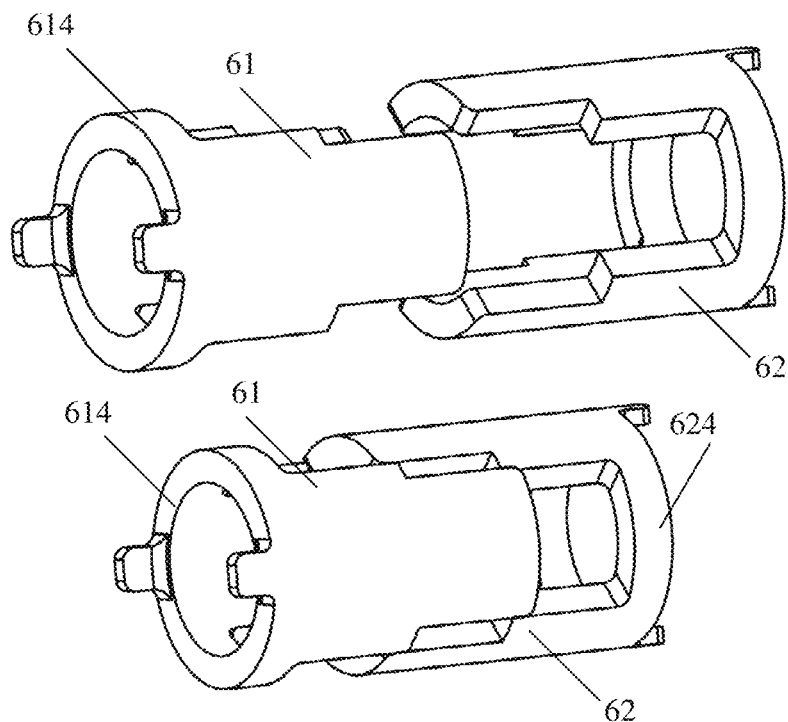
FIG. 16 is an exemplary diagram of a separable sleeve with a closed ring design at ends provided by the embodiment of the present application.

As shown in FIG. 8 or FIG. 16, in some embodiments, an end 614 of the first portion 61 may be designed as a closed ring sleeved on the feeding pipe 5; and/or an end 624 of the second portion 62 (the end 614 and the end 624 may define a length of the sleeve 6 along the axial direction) may be designed as a closed ring sleeved on the feeding pipe 5. This could enhance the overall rigidity and tightness of the sleeve 6.

In some embodiments, when the first portion 61 is a sliding part and the second portion 62 is a fixing part, as shown in FIGS. 14 to 15, two ends of the first portion 61 may be designed as closed rings. This could enhance the overall rigidity and tightness of the sleeve 6.

The relationship between the size of the discharge port 65 and the size of the opening 52 is not specifically limited in the embodiment of the present application. The size of the discharge port 65 may be the same as or different from the size of the opening 52.

For example, the length of the discharge port 65 (when the discharge port 65 is a discharge port with an adjustable length, the length of the discharge port 65 may refer to the maximum length of the discharge port 65) may be less than the length of the opening 52; for another example, the width of the discharge port 65 (when the discharge port 65 is a discharge port with an adjustable width, the width of the discharge port 65 may refer to the maximum width of the discharge port 65) may be less than the width of the opening 52.

The adjustment of the size of the discharge port 65 may be achieved by means of a drive apparatus. For example, in FIG. 4, a support 91 for fixing the first portion 61 and a support 92 for fixing the second portion 62 may be disposed on the sleeve 6. A drive apparatus 7 may provide the support 91 and the support 92 with power of movement along the axial direction of the feeding pipe 5, so that the first portion 61 is driven to move along the axial direction by the support 91, and the second portion 62 is driven to move along the axial direction by the support 92.

The drive apparatus 7 may be specifically implemented in a variety of manners, which is not limited in the embodiment of the present application, and may be, for example, a rack and pinion mechanism or a crank slider mechanism.

As described above, the outer wall of the sleeve 6 may be provided with one discharge port 65, or may be provided with a plurality of discharge ports 65. For example, the outer wall of the sleeve 6 may be provided with two discharge ports, three discharge ports, four discharge ports, and eight discharge ports. The sleeve 6 is movable relative to the feeding pipe 5 such that the opening 52 is capable of being in communication with different discharge ports 65 (that is, realizing a switch between the different discharge ports 65).

As an example, the plurality of discharge ports 65 may be arranged along the axial direction of the feeding pipe 5. In this case, the sleeve 6 may be translated along the axial direction of the feeding pipe 5 such that the opening 52 is capable of being in communication with different discharge ports 65.

As another example, the plurality of discharge ports 65 may be arranged along a circumferential direction of the sleeve 6. In this case, the sleeve 6 is rotatable around an axis of the feeding pipe 5 such that the opening 52 is capable of being in communication with different discharge ports 65. In order to achieve rotation of the sleeve 6 around the axis of the feeding pipe 5, the device 4 may also be designed with a corresponding drive apparatus. The drive apparatus may be, for example, a gear transmission mechanism.

Of course, a combination of the above two examples is also possible.

Hereinafter, with reference to FIGS. 12, 13, 17 and 18, exemplary description is made to a manner in which a plurality of discharge ports 65 are formed on an outer wall of a sleeve 6 in detail.

Figure 17:
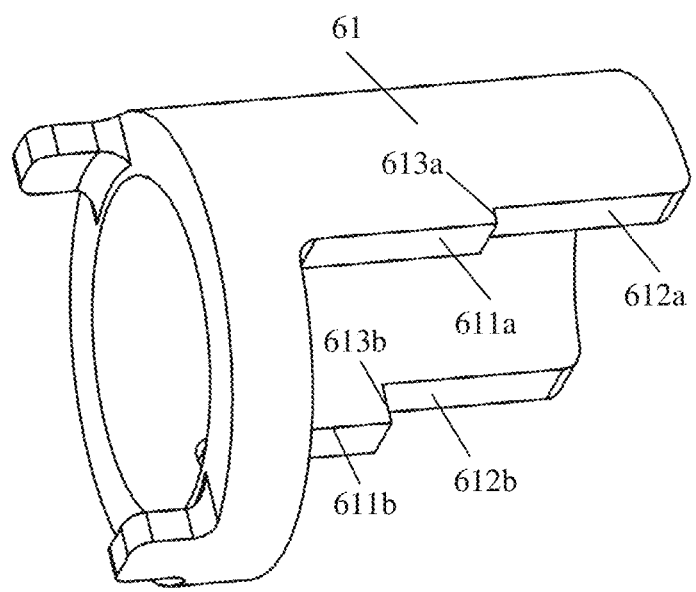
FIG. 17 is an exemplary diagram of a three dimensional structure of a separable portion of a separable sleeve provided by another embodiment of the present application.
Figure 18:
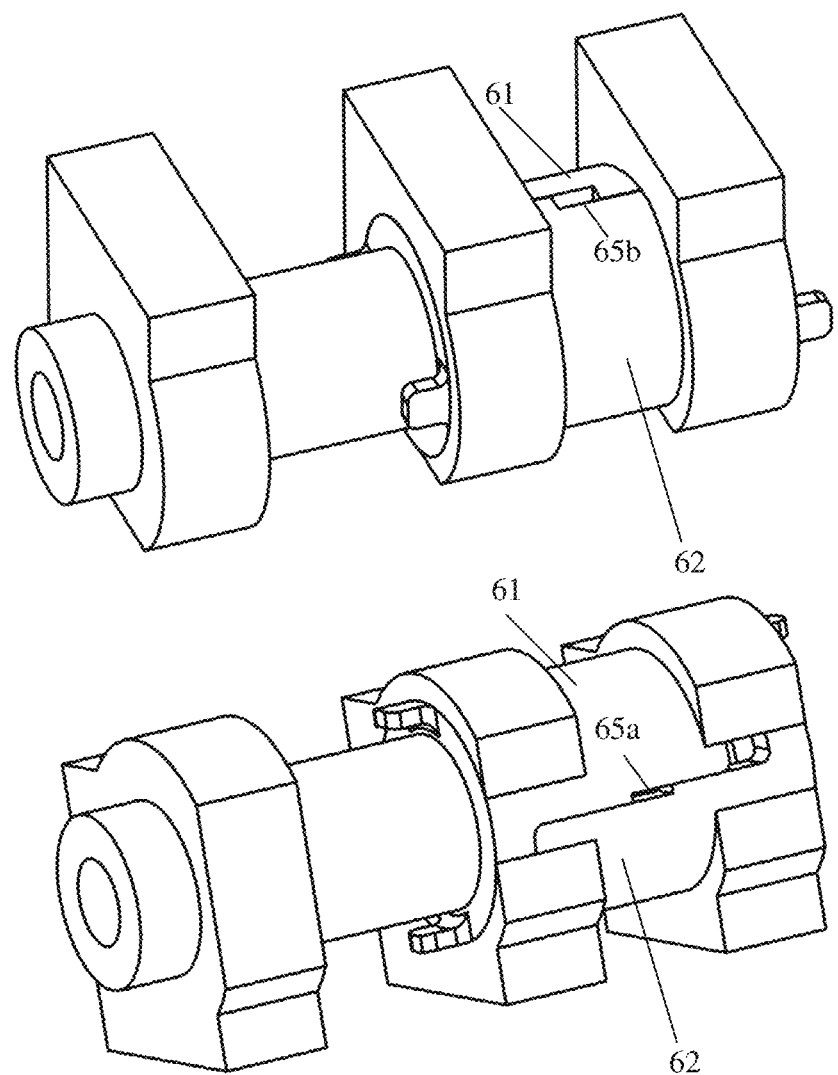
FIG. 18 is an assembled view of a sleeve spliced from the separable portion shown in FIG. 17 and a feeding pipe.

As one possible implementation manner, referring to FIGS. 17 to 18, the sleeve 6 may include a first portion 61 and a second portion 62. The first portion 61 and the second portion 62 are similar to the first portion 61 and the second portion 62 shown in FIGS. 8 and 9, except that in FIGS. 17 to 18, two abutting faces of the first portion 61 and the second portion 62 are both stepped abutting faces, and specifically, stepped abutting faces 611*a*, 612*a* and 613*a* of the first portion 61 and the corresponding faces of the second portion are used to form a discharge port 65*a*; and stepped abutting face 611*b*, 612*b* and 613*b* of the first portion 61 and the corresponding faces of the second portion are used to form a discharge port 65*b*.

Figure 12:
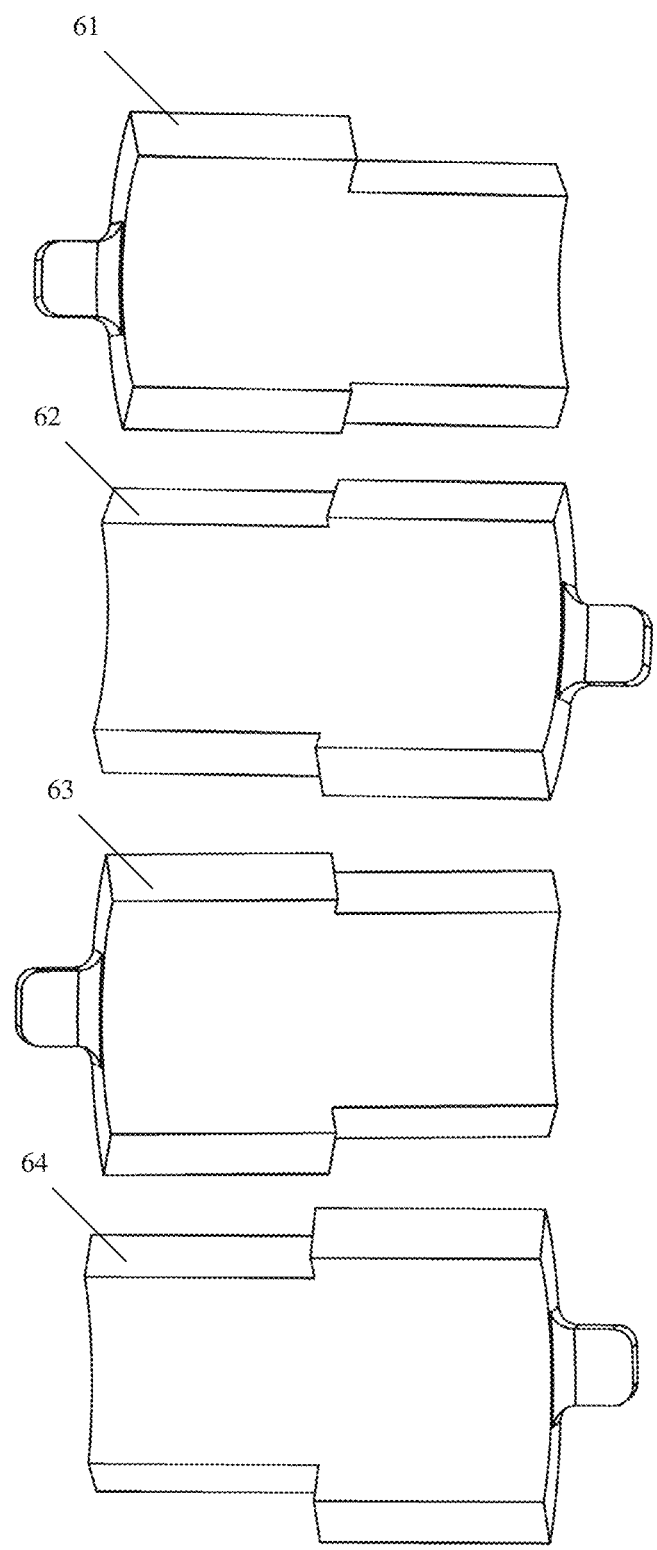
FIG. 12 is an exploded view of various separable portions of a separable sleeve provided by an embodiment of the present application.
Figure 13:
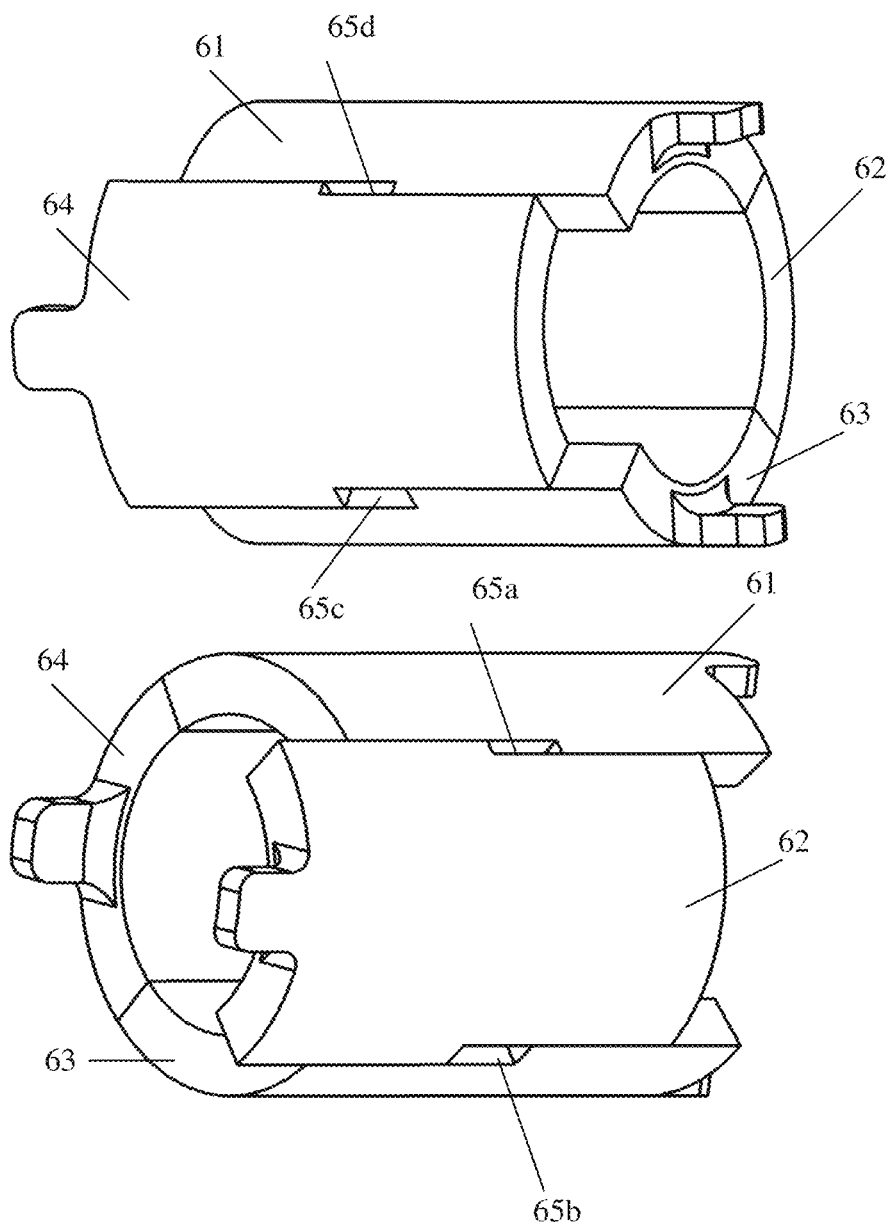
FIG. 13 is an assembled view of the various separable portions shown in FIG. 12.

As another possible implementation manner, referring to FIG. 12 to FIG. 13, the sleeve 6 is formed by splicing four portions 61, 62, 63, 64, and each two adjacent portions form a discharge port, and a total of four discharge ports 65*a*, 65*b*, 65*c*, 65*d* are formed. Of course, in some embodiments, abutting faces of two adjacent portions may also be designed as a plane, so that a discharge port will not be formed between the two adjacent portions, and furthermore, any number of discharge ports can be designed according to actual needs (for example, an odd number of discharge ports can be designed, or an even number of discharge ports can be designed).

Sizes of a plurality of discharge ports 65 are not specifically limited in the embodiment of the present application. The plurality of discharge ports 65 may be discharge ports of the same size (if the discharge ports 65 are discharge ports with adjustable sizes, the same size may refer that the maximum sizes of the discharge ports 65 are the same), or discharge ports of different sizes.

As an example, lengths (or maximum lengths) of the plurality of discharge ports 65 are different.

As another example, widths of the plurality of discharge ports 65 are different. The widths of the discharge ports 65 affect a width of an extruded material, which in turn affects accuracy of 3D printing. The plurality of discharge ports 65 with different widths are designed so that the device 4 can select the discharge ports with different levels of accuracy for printing according to actual needs.

For example, assuming that a layer to be printed includes a first printing region in which a cross-sectional contour line changes sharply in a vertical direction and a second printing region in which a cross-sectional contour line changes gently in the vertical direction, when the device 4 is used to print the first printing region, it can be switched to a discharge port with a smaller width, thereby improving printing accuracy; and when the device 4 is used to print the second printing region, it can be switched to a discharge port with a larger width, thereby improving printing efficiency on the premise of printing accuracy.

Of course, the combination of the above cases is also possible, that is, widths and lengths (or the maximum lengths) of the plurality of discharge ports 65 are all different.

As indicated above, the discharge port 65 provided by the embodiment of the present application may be a discharge port 65 with a continuously adjustable length. Compared with design of a discharge port of a conventional 3D printing head, the discharge port 65 is designed as a discharge port with the continuously adjustable length, which overcomes the limitation of the conventional discharge port design concept, and has obvious advantages and broad application prospects. The following is an analysis of this.

A discharge port of a conventional 3D printing head is generally designed as a nozzle in a fixed shape. A common shape of the nozzle includes a round hole, a square hole, or a slightly deformed irregular shaped hole with equal diameter. A diameter of the nozzle is generally about 1 mm, and a common diameter is 0.4 mm. When an article is required to be high in printing accuracy, a nozzle with a small diameter is generally selected. Such type of nozzle has less the amount of the material extrusion per unit time and is lower in printing efficiency. When an article is required to be high in printing efficiency, a nozzle with a large diameter is generally selected. Such type of nozzle prints an article in a rough shape and is lower in printing accuracy. Thus, it can be seen that the conventional 3D printing head cannot take both printing efficiency and printing accuracy of 3D printing into account. A formation process of such design manner of a conventional discharge port is analyzed below.

A 3D printing technology is a more advanced manufacturing technology developed on the basis of a 2D printing technology. Generally, before 3D printing, it usually needs to perform layer processing on a 3D model of an article to be printed. The layer processing is equivalent to decomposing a 3D article printing process into many 2D printing processes, that is, a printing process of each layer may be considered as a planar printing process. Therefore, a conventional 3D printing device follows many design concepts of a 2D printing device. Most obviously, a discharge port of a 2D printing head generally adopts a nozzle in a fixed shape. A discharge port of a 3D printing head, following the design manner of the discharge port of the 2D printing head, is also designed as a nozzle in a fixed shape. As mentioned above, the design of such type of nozzle results in that 3D printing head cannot take both printing efficiency and printing accuracy into account, and becomes a key obstacle to the development of the 3D printing technology.

A discharge port 65 in an embodiment of the present application is designed as a discharge port with a continuously adjustable length within a certain range. This is a design based on a full consideration of characteristics of a 3D printing object. Compared with the conventional 3D printing device, a 3D printing device provided by an embodiment of the present application makes it possible to take both efficiency and accuracy of 3D printing into account, and is more suitable for 3D printing. Specific illustration is as follows.

A 2D printing object is generally small in size, and the printing object is mainly a text or an image. The text or image may be freely arranged in a two dimensional plane and there is no rule to follow. Therefore, it is common to design a discharge port of a 2D printing device as a nozzle in a fixed shape, and such design is reasonable in the field of 2D printing. Different from the 2D printing object, a 3D printing object is generally a 3D article for practical usage. Since the 3D article has a certain physical contour, an intercept line of the 3D article along one section is generally one or more closed and continuously changing curves. Making full use of such characteristic of the 3D printing object, the embodiment of the present application designs a discharge port 65 as a discharge port with a continuously adjustable length. The continuous adjustment of the length of the discharge port 65 coincides with the characteristic that a cross-sectional contour line of the 3D printing object is closed and continuously changing. Such discharge port 65 is more suitable for 3D printing, making it possible to greatly increase the printing efficiency.

For example, with a discharge port provided by the embodiment of the present application, continuous printing may be performed along a cross-sectional contour line. During printing, the discharge port 65 is controlled to change according to changes of the cross-sectional contour line. It should be understood that compared to a manner of conventional printing on a pass-by-pass basis, printing along the cross-sectional contour line has ultrahigh printing efficiency.

Further, a width of the discharge port 65 may be set as a fixed small value, enabling printing accuracy of a 3D article to maintain unchanged and at a higher accuracy. The printing accuracy is maintained unchanged during continuous change of the discharge port 65, which is difficult to be realized by a conventional 3D printing head. Therefore, a discharge port with a continuously adjustable length provided by an embodiment of the present application makes it possible to take both printing efficiency and printing accuracy of 3D printing into account, and is more suitable for the 3D printing.

Hereinafter, with reference to specific embodiments, exemplary description is made to a changing manner of the length of the discharge port 65 in detail.

Optionally, the length of the discharge port 65 may be controlled to continuously change according to a shape of a target printing region (or the length of the discharge port 65 may be controlled to change with a change of the shape of the target printing region), and the target printing region may be part of a printing region of a layer to be printed or all of the printing region of the layer to be printed.

For example, in some embodiments, the size of the discharge port 65 may be adjusted such that the length of the discharge port 65 matches lengths of intercept line segments of a cross-sectional contour line of a target printing region of a layer to be printed.

For another example, in some embodiments, the size of the discharge port 65 may be adjusted such that two ends of the discharge port 65 are aligned with the cross-sectional contour line of the target printing region in a vertical direction.

When the two ends of the discharge port 65 are aligned with the cross-sectional contour line of the target printing region in the vertical direction, projection of the two ends of the discharge port 65 in the vertical direction will fall on the intercept line segments of the cross-sectional contour line of the target printing region. For convenience of description, this printing method will hereinafter be referred to as tracking printing of the cross-sectional contour line of the target printing region.

The tracking printing will be described in more detail below with reference to FIG. 19.

Figure 19:
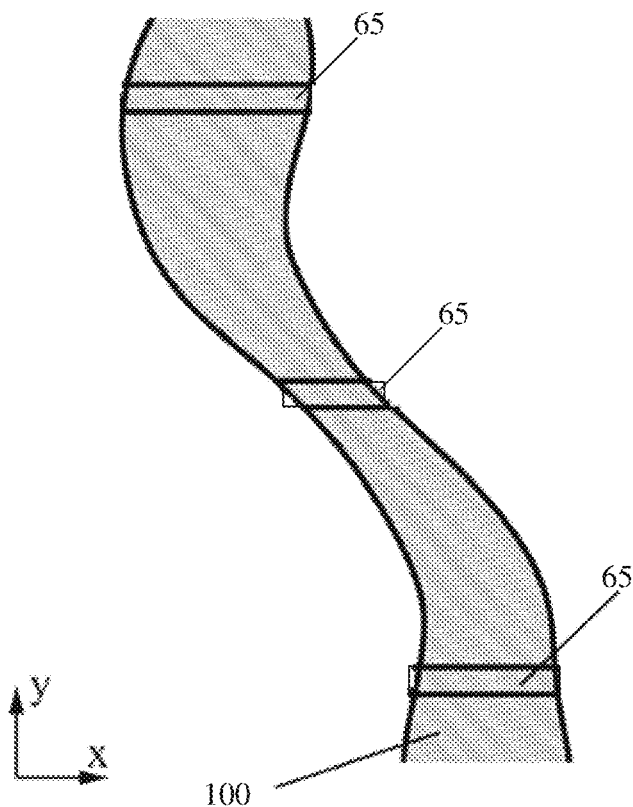
FIG. 19 is an exemplary diagram of a printing process of a device provided by an embodiment of the present application.

Referring to FIG. 19, reference sign 100 denotes a target printing region of a layer to be printed, and a length of the discharge port 65 extends along an x direction. During printing of the target printing region 100, the device 4 may be controlled to move generally towards a y direction. During the movement of the device 4, the length and/or position of the discharge port 65 are changed in real time such that two ends of the discharge port 65 are always aligned with a cross-sectional contour line of the target printing region 100 in a vertical direction z (perpendicular to an x-y plane), that is, projection of the two ends of the discharge port 65 in the vertical direction z always falls on the cross-sectional contour line of the target printing region 100.

For example, assuming that y coordinate of the current position of the discharge port 65 is y1, and the cross-sectional contour line of the target printing region 100 is transected at y1 along the x direction to obtain two points (x1, y1) and (x2, y1), positions of two ends of the discharge port 65 can be changed such that the first end is located directly above (x1, y1) and the second end is located directly above (x2, y1), and further, accurate tracking printing can be performed on the cross-sectional contour line of the target printing region 100.

The tracking printing of the cross-sectional contour line of the target printing region may be implemented in a variety of manners. Optionally, as a first implementation manner, the positions of two ends of the discharge port 65 may be adjusted such that the two ends of the discharge port 65 are aligned with the cross-sectional contour line of the target printing region in the vertical direction.

Optionally, as a second implementation manner, the size of the discharge port 65 may be adjusted such that the length of the discharge port 65 matches the lengths of the intercept line segments of the cross-sectional contour line of the target printing region of the layer to be printed; and a relative position between the feeding pipe 5 and the sleeve 6 as a whole and the printing platform is adjusted by using a drive apparatus such that two ends of the discharge port 65 are aligned with the cross-sectional contour line of the target printing region in a vertical direction.

In the process of printing the target printing region, the device 4 may implement tracking printing by using one of the above two implementation manners according to actual needs; or different tracking printing methods may also be used when different parts of the target printing region are printed.

For example, the target printing region may include a portion having a shorter length of the intercept line segment and a portion having a longer length of the intercept line segment. When a portion with a short length of the intercept line segment is printed, the first implementation manner may be used for tracking printing to simplify the control of the device 4; and when a portion with a longer length of the intercept line segment is printed, the second implementation manner may be used for tracking printing.

Figure 20:
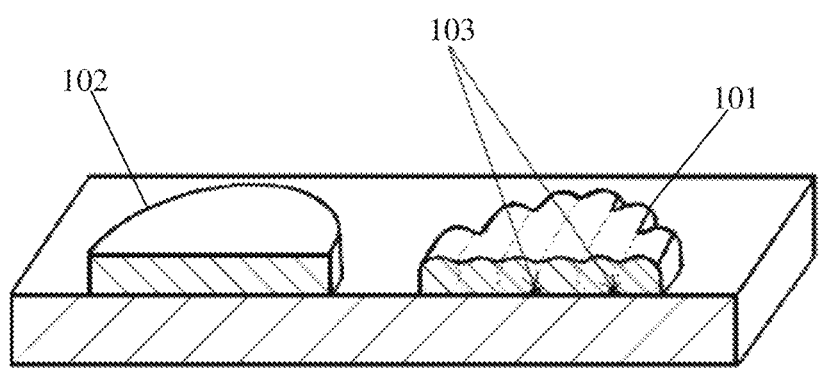
FIG. 20 is a comparison diagram of printing effects of a device provided by an embodiment of the present application and a conventional 3D printing method.
Figure 21:
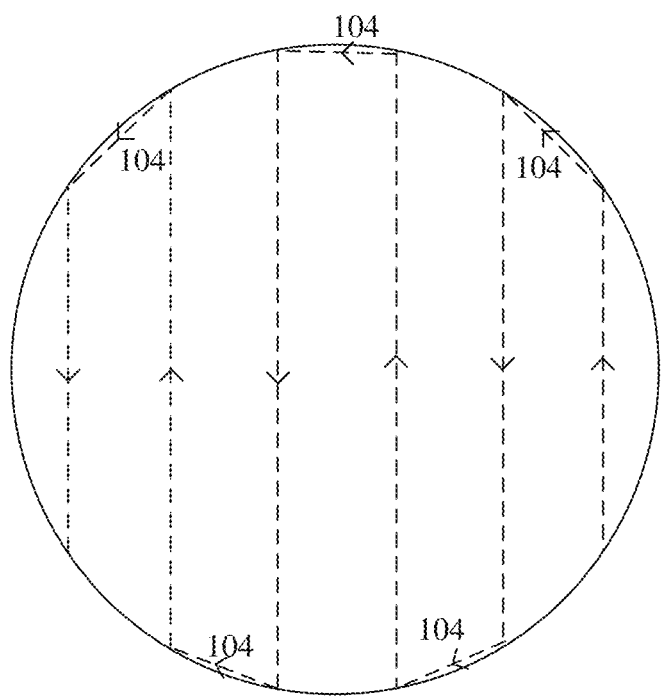
FIG. 21 is an exemplary diagram of a pass switching manner in a conventional 3D printing method.

Compared with an article printed by a conventional discharge port, a cross-sectional contour line of a target printing region is tracked and printed, and the printed article also has a significant improvement in mechanical properties and shape uniformity. Referring to FIG. 20 and FIG. 21, detailed illustration is given thereto.

Conventional 3D printing is generally performed on a pass-by-pass basis according to a certain pass sequence. Since a size of a discharge port of a conventional 3D printing device is small (a diameter is generally of a millimeter level), it takes a long time to print each pass. When a current pass is prepared to be printed, material on a previous pass adjacent to the current pass may have been in or close to a solidification state, and material on the current pass is still in a molten state. The material in the molten state on the current pass needs to be fused with the material on the previous pass that have been in or close to a solidification state to form an integral part. A process of material fusion between adjacent passes herein is called a pass overlap.

In a process of a pass overlap, if the previous pass of the current pass has already solidified or been close to solidified and the current pass is still in a molten state, a phenomenon of poor fusion may occur in a material fusion process between adjacent passes, which results in a poor mechanical property of a printed article. In addition, since the state of materials is not synchronized, a shape of an object obtained after fusion of materials on adjacent passes is also relatively rough. For example, in a case of printing a cylinder, as shown in FIG. 20, a cylinder 101 is printed in a pass overlap manner by using a conventional 3D printing technique. The cylinder 101 not only has an overall rough shape and contour, but also has a plurality of notches 103 due to poor material fusion in a process of pass overlap.

A device 4 provided by an embodiment of the present application tracks and prints a cross-sectional contour line of a target printing region by adjusting a length and a position of a discharge port 65. Therefore, in the process of printing the target printing region, the device 4 does not need to perform printing on a pass-by-pass basis according to a pass, so that it is not necessary to perform a pass overlap, and no problem of poor fusion occurs. Therefore, an article printed by the device 4 has a high mechanical property. As shown in FIG. 20, a cylinder 102 is printed by a device 4. Compared to the cylinder 101, a filling material of the cylinder 102 is in good fusion condition, and there is no problem of poor fusion caused by a pass overlap.

To still take the case of printing a cylinder as an example, referring to FIG. 21, in a conventional 3D printing process, a switch between passes is performed according to a fold line 104 instead of a real contour curve, that is, a fold line is used to approximate a real contour curve, resulting in that a printed contour line of a cylinder 101 is relatively rough. A device 4 provided by an embodiment of the present application does not need to perform printing according to a pass, but tracks and prints a cross-sectional contour line of a target printing region by adjusting a length and a position of a discharge port 65. Therefore, a contour line of a cylinder 102 printed by the device 4 is also smoother and more realistic.

The target printing region may be determined in a variety of manners. For example, whether all of the printing region of a layer to be printed is regarded as a target printing region or divided into a plurality of target printing regions respectively for printing may be determined according to one or more factors of a shape of a cross-sectional contour line of the layer to be printed, a length of the longest intercept line segment, and a size of a discharge port.

For example, when a length of the longest intercept line segment of the cross-sectional contour line of the layer to be printed is less than or equal to the maximum length of the discharge port, all of the printing region of the layer to be printed may be determined as the target printing region; or when a length of the longest intercept line segment of the cross-sectional contour line of the layer to be printed is greater than the maximum length of the discharge port, all of the printing region of the layer to be printed is divided into a plurality of the target printing regions.

As another example, when the cross-sectional contour line of the layer to be printed encompasses a plurality of closed regions that are not in communication, each of the closed regions may be regarded as one or more target printing regions for printing.

As another example, in some embodiments, instead of dividing all of a printing region of the layer to be printed, all of the printing region of the layer to be printed is directly regarded as the target printing region. For example, the device 4 may be designed as a special-purpose device that specifically prints a particular article, and the length of the discharge port 65 of the device 4 is designed to be able to print all of the printing region of each printing layer of the article at once. In this way, in actual operation, the device 4 can print each layer of the article in a fixed manner without the need to divide the printing region online.

Figure 22:
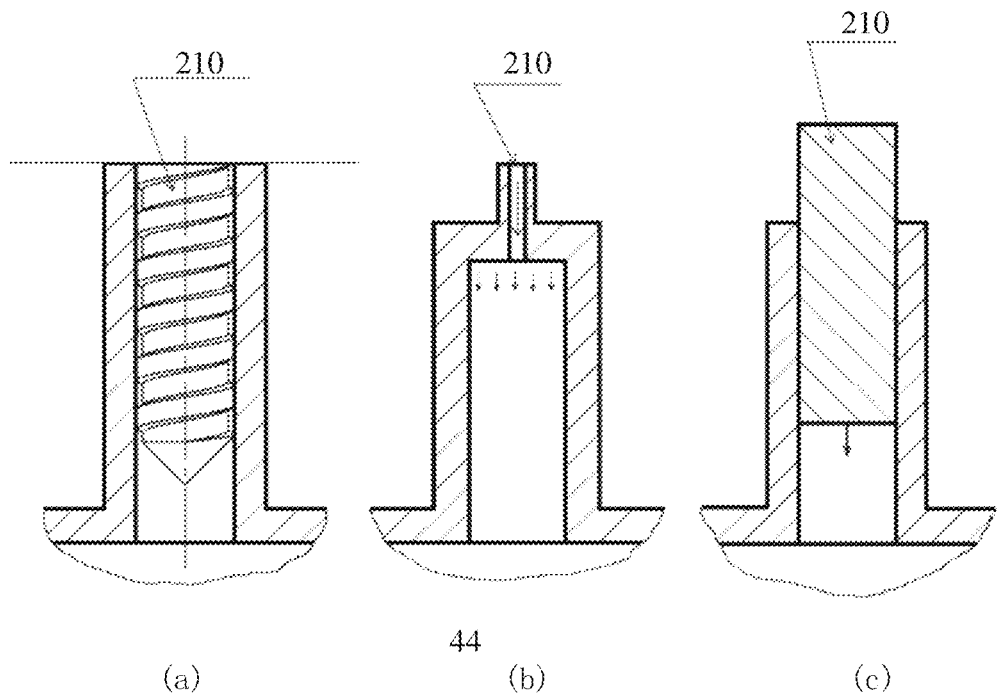
FIG. 22 is an exemplary diagram of a feeding apparatus provided by an embodiment of the present application.

As shown in FIG. 22, the device 4 may further include a feeding apparatus 200. The feeding apparatus 200 may feed material for the discharge port 65 through the feeding pipe 5. The device 4 may further include a drive apparatus (not shown in the figure) configured to drive the feeding apparatus 200. Driving of the feeding apparatus by the drive apparatus can enable the amount of the material extrusion of the discharge port 65 to match the size of the discharge port.

The feeding apparatus 200 may be a screw feeding apparatus as shown in FIG. 22 (*a*), a pneumatic feeding apparatus as shown in FIG. 22 (*b*) or a piston feeding apparatus as shown in FIG. 22 (*c*).

In the case that the feeding apparatus 200 is a screw feeding apparatus, an amount of material extruded from a discharge port 65 may be controlled in such a way that a drive apparatus adjusts a rotation speed of a screw, in the case that the feeding apparatus 200 is a pneumatic feeding apparatus, the amount of material extruded from the discharge port 65 may be controlled by adjusting a pressure acting on a liquid surface of the material; and in the case that the feeding apparatus 200 is a piston feeding apparatus, the amount of material extruded from the discharge port 65 may be controlled in such a way that a drive apparatus adjusts a moving speed of a piston in a piston cylinder-shaped feed port.

That the amount of the material extrusion of the discharge port 65 matches the length of the discharge port 65 means that the amount of the material extrusion of the discharge port 65 changes in proportion to the length of the discharge port 65.

During actual printing, the amount of the material extrusion may be determined according to the length of the discharge port 65. Then, the amount of material feeding of the feeding apparatus 200 may be controlled so that the material feeding amount is equal to the amount of the material extrusion.

As shown in FIG. 4, the device 4 may also include a control apparatus 8 for controlling the various drive apparatuses mentioned above. The control apparatus 8 may be a special-purpose numerical control device or a general-purpose processor. Furthermore, the control apparatus 8 may be a distributed control apparatus or a centralized control apparatus.

Hereinafter, description is made to a method embodiment of the present application. Since the method embodiment may be performed by the device 4 described above (specifically by the control apparatus 8 in the device 4), parts not described in detail may refer to the above text.

A device for 3D printing is also provided by an embodiment of the present application, which has a discharge port with adjustable length, and an extrusion passage of the discharge port is a structure with variable section along material flow direction.

For example, the extrusion passage of the discharge port is a structure in which a section along material flow direction gradually shrinks to a required size of the discharge port. Size of the discharge port may include width and length.

For example, the extrusion passage of the discharge port is a structure in which the section along material flow direction gradually shrinks to a required width of the discharge port. In other words, width of the section of the extrusion passage of the discharge port along material flow direction gradually shrinks to a required width of the discharge port.

For another example, the extrusion passage of the discharge port is a structure in which the section along material flow direction gradually shrinks to a required length of the discharge port.

In order to realize that the extrusion passage of the discharge port is a structure in which the section along material flow direction gradually shrinks to a required size of the discharge port, the discharge port may be designed in a variety of ways.

Figure 23:
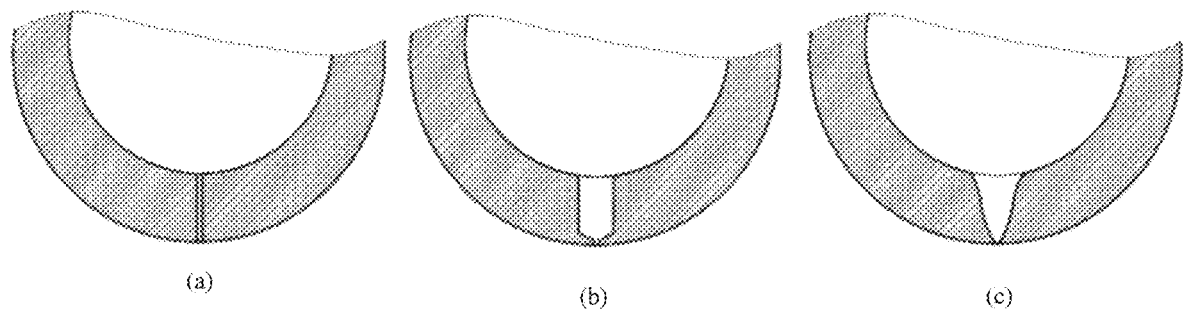
FIG. 23 is a side view of a passage of an opening in a device for 3D printing provided by yet another embodiment of the present application.

As an example, as shown in FIG. 23 (*b*), the section of the extrusion passage of the discharge port in a length direction may be a stepped flow passage section.

As another example, as shown in FIG. 23 (*c*), the section of the extrusion passage of the discharge port in a length direction may be a streamlined flow passage section.

Optionally, the section of the extrusion passage of the discharge port in a length direction may be designed as other feasible shapes or patterns, as long as it can make the extrusion passage of the discharge port to be a structure in which the section along material flow direction gradually shrinks to a required size of the discharge port.

As yet another example, the section of the extrusion passage of the discharge port in a width direction may also be a stepped flow passage section or a streamlined flow passage section (not shown in the figure).

A 3D printing extrusion material is usually a high viscosity substance, and a resistance produced by the extrusion material is proportional to a passage length of the discharge port. When a width of the discharge port is very small (a relatively small width of the discharge port will be required when the printing accuracy is high), the discharge port is equivalent to a slit passage as shown in FIG. 23 (*a*), and the resistance of the extrusion material will be very large, which will reduce the printing efficiency. In this case, a very large extrusion pressure is required to be provided to squeeze the material out of the slit passage at a high speed in order to achieve high precision 3D printing with high efficiency, and the material conveying system is required to provide a very large conveying power, which will significantly raise cost of printing, making the printing process uneconomic.

In the device provided by an embodiment of the present application, the extrusion passage of the discharge port is a structure in which the section along material flow direction gradually shrinks to a required size of the discharge port, which can effectively reduce a resistance of material extrusion, so as to improve the efficiency of printing molding. In addition, since the resistance of material extrusion can be reduced, a requirement on conveying power of the material conveying system can be reduced, so as to reduce printing cost.

An application scenario of this embodiment includes, but is not limited to, the device 4 provided in the above embodiments.

For example, the device for 3D printing provided by an embodiment of the present application is the device 4 provided in the above embodiments, and the discharge port provided by an embodiment of the present application is the discharge port 65 in the device 4.

When the sleeve 6 is an integrally formed sleeve, a mold of the sleeve 6 may be used to form the discharge port 65 in which the section along material flow direction of the extrusion passage gradually shrinks to a required size of the discharge port.

When the sleeve 6 includes a plurality of separable portions, a stepped structure may be disposed on abutting faces of adjacent two portions to form the discharge port 65 in which the section along material flow direction of the extrusion passage gradually shrinks to a required size of the discharge port.

For example, in the above embodiments shown in FIGS. 8-10 and FIGS. 17-18, the abutting faces between the first portion 61 and the second portion 62 may have a stepped structure along material outflow direction to make a passage of the discharge port 65 be a structure in which a section along material outflow direction gradually shrinks to a required size of the discharge port 65.

For example, in the above embodiments shown in FIGS. 12 and 13, abutting faces between two portions spliced from the first portion 61, the second portion 62, the third portion 63 and the fourth portion 64 may have a stepped structure along material outflow direction to make a passage of the discharge port 65 be a structure in which a section along material outflow direction gradually shrinks to a required size of the discharge port 65.

Figure 24:
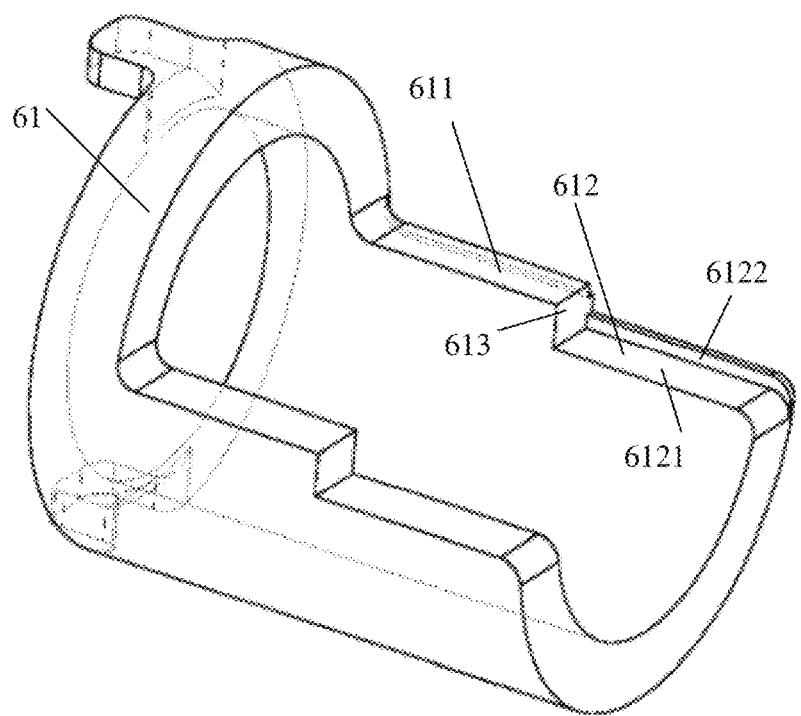
FIG. 24 is a structural view of a first portion of a sleeve in the device shown in FIG. 26.
Figure 25:
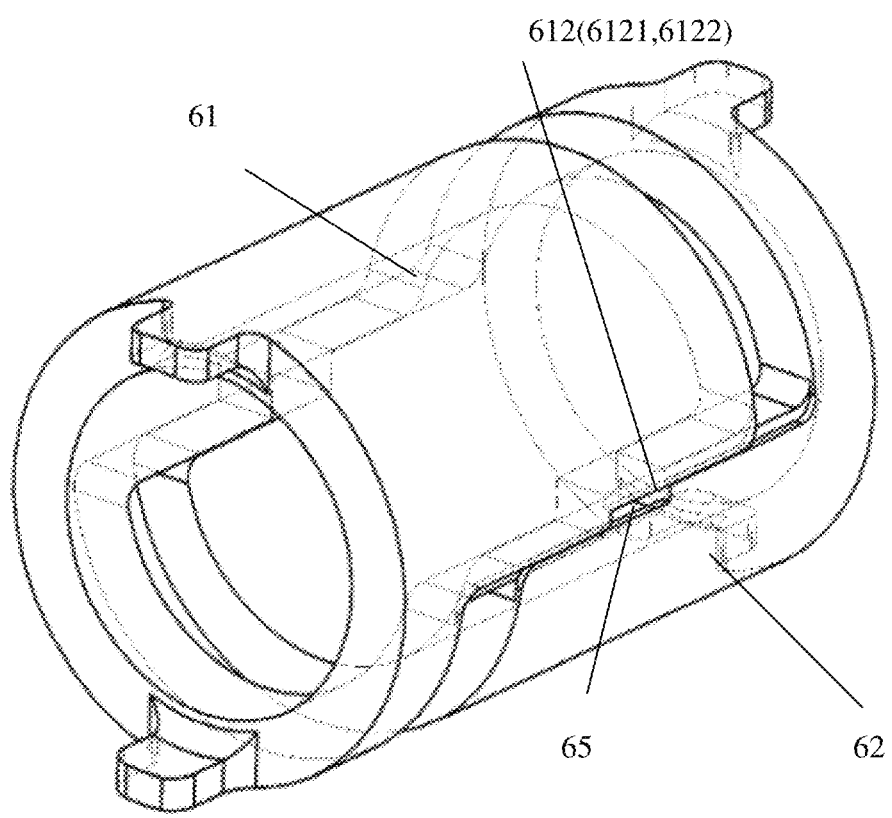
FIG. 25 is a structural view of a sleeve in the device shown in FIG. 26.

Taking an embodiment shown in FIGS. 8 to 10 as an example, the abutting face 612 of the first portion 61 may include a stepped structure along material outflow direction as shown in FIG. 24, and the abutting face 612 may include an upper stepped surface 6121 and a lower stepped surface 6122. The abutting face 622 of the second portion 62 may also include a stepped structure along material outflow direction (similar to the stepped structure of the abutting face 612, not shown in the figure). In this way, the extrusion passage of the discharge port 65 formed by abutting between the first portion 61 and the second portion 62 is a structure in which the section along material flow direction gradually shrinks to a required size of the discharge port, as shown in FIG. 25. In this example, the section of the extrusion passage of the discharge port 65 in a length direction is a stepped flow passage section as shown in FIG. 23 (b).

Figures 26, 27:
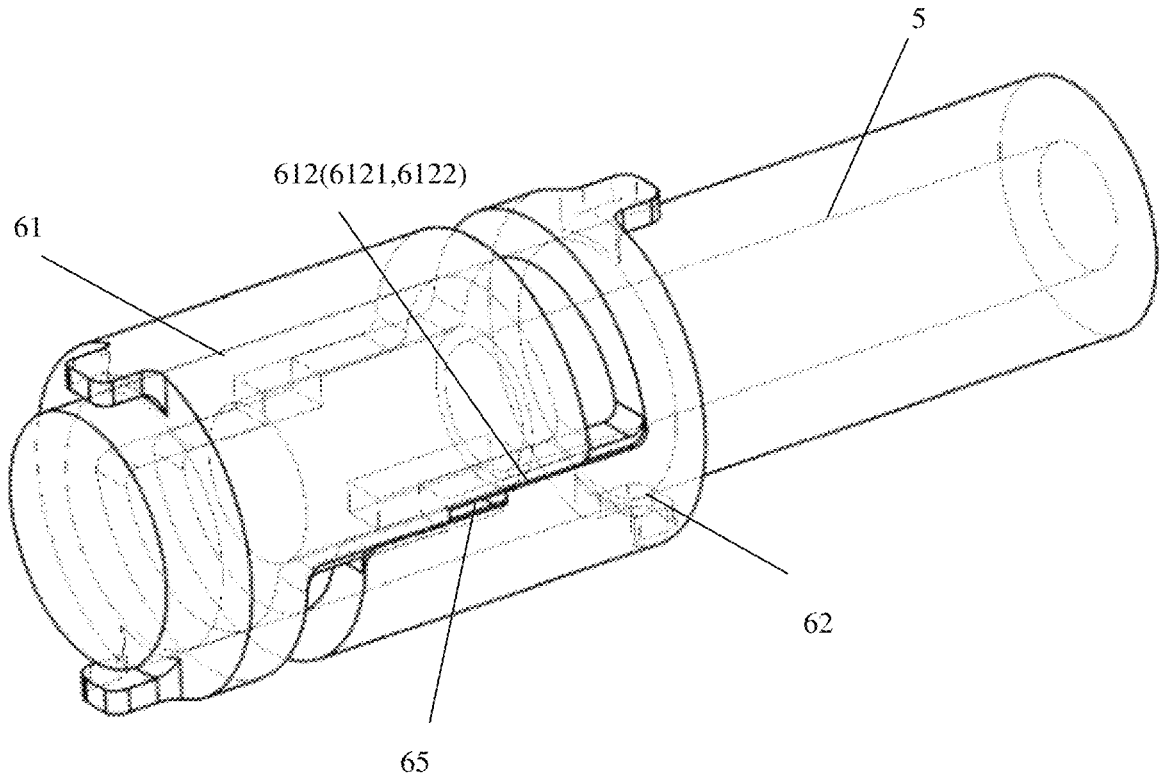
FIG. 26 is a stereoscopic view of a device for 3D printing provided by yet another embodiment of the present application.
FIG. 27 is a schematic flowchart of a control method provided by an embodiment of the present application.

The first portion 61 and the second portion 62 shown in FIG. 25 are assembled together with the feeding pipe 5, to form the device 4 with the discharge port 65, whose extrusion passage has a structure in which the section along material flow direction gradually shrinks to a required width of the discharge port, as shown in FIG. 26. In the example shown in FIG. 26, cross sections of the feeding pipe 5 and the sleeve 6 in a direction through the extrusion passage of discharge port 65 are shown in FIG. 7, and the discharge port 65(1) shown in FIG. 7 indicates a discharge port whose extrusion passage is a structure in which the section along material flow direction gradually shrinks to a required size of the discharge port.

FIG. 27 is a schematic flowchart of a control method provided by an embodiment of the present application. The control method of FIG. 27 may control a device for 3D printing. The device may for example be the device 4 described above, and the control method may for example be performed by the control apparatus 8 in the device 4.

The device may include a feeding pipe and a sleeve. An opening extending along an axial direction of the feeding pipe is disposed on an outer wall of the feeding pipe. A sleeve may be sleeved on the feeding pipe, and a discharge port in communication with the opening is disposed on an outer wall of the sleeve. The sleeve may rotate around an axis of the feeding pipe relative to the feeding pipe.

The method of FIG. 27 may include step S2710 of controlling the sleeve to rotate around the axis of the feeding pipe relative to the feeding pipe, so as to make the discharge port and the opening communicated or no longer communicated.

Optionally, the step S2710 includes: controlling the sleeve to rotate around an axis of the feeding pipe relative to the feeding pipe when printing is required to be suspended, so as to make the discharge port no longer be in communication with the opening to block a material conveying passage.

Optionally, the step S2710 includes: controlling the sleeve to rotate around the axis of the feeding pipe relative to the feeding pipe when printing is required to be started, so as to make the discharge port be in communication with the opening to open a material conveying passage.

Optionally, the method of FIG. 27 may include step S2720 of adjusting a size of the discharge port.

Optionally, the outer wall of the sleeve includes a first portion and a second portion, and the first portion and the second portion are slidable relative to each other along the axial direction. Step S2720 may include: controlling the relative sliding between the first portion and the second portion for adjusting the size of the discharge port.

Optionally, the first portion includes a first upper stepped surface, a first lower stepped surface and a first connecting surface connecting the first upper stepped surface and the first lower stepped surface, the second portion includes a second upper stepped surface, a second lower stepped surface and a second connecting surface connecting the second upper stepped surface and the second lower stepped surface, the first upper stepped surface and the first lower stepped surface are in contact with the second lower stepped surface and the second upper stepped surface, respectively, and are slidable relative to the second lower stepped surface and the second upper stepped surface along the axial direction, and a hollow area formed by the first lower stepped surface, the first connecting surface, the second lower stepped surface and the second connecting surface is the discharge port.

Optionally, step S2720 may include: adjusting the size of the discharge port such that the length of the discharge port matches lengths of intercept line segments of a cross-sectional contour line of a target printing region of a layer to be printed, where the target printing region is part or all of a printing region of the layer to be printed.

Optionally, step S2720 may include: adjusting the size of the discharge port such that two ends for defining a length of the discharge port are aligned with the cross-sectional contour line of the target printing region in a vertical direction.

Optionally, the method of FIG. 27 may further include: adjusting a relative position between the feeding pipe and the sleeve as a whole and a printing platform, such that two ends for defining the length of the discharge port are aligned with the cross-sectional contour line of the target printing region in a vertical direction.

Optionally, the method of FIG. 27 may further include: determining all of the printing region of the layer to be printed as the target printing region when a length of the longest intercept line segment of the cross-sectional contour line of the layer to be printed is less than or equal to the maximum length of the discharge port; or dividing all of the printing region of the layer to be printed into a plurality of the target printing regions when a length of the longest intercept line segment of the cross-sectional contour line of the layer to be printed is greater than the maximum length of the discharge port.

Optionally, the method of FIG. 27 may further include: controlling a feeding apparatus to feed material for the discharge port such that the amount of the material extrusion of the discharge port matches the size of the discharge port.

Optionally, a plurality of discharge ports are disposed on the outer wall of the sleeve. The method of FIG. 27 may further include: controlling the sleeve to move relative to the feeding pipe such that the opening is capable of being in communication with different discharge ports.

Optionally, the plurality of the discharge ports are arranged along a circumferential direction of the sleeve, and the controlling the sleeve to move relative to the feeding pipe such that the opening is capable of being in communication with different discharge ports may include: controlling the sleeve to be rotatable around an axis of the feeding pipe such that the opening is capable of being in communication with different discharge ports.

Optionally, the widths of different discharge ports are different.

The above embodiments may completely or partly be implemented in software, hardware, firmware or a random combination thereof. When implemented by software, they may completely or partly be implemented in the form of a computer program product. The computer program product includes one or more computer instructions. When the computer program instructions are loaded and executed on a computer, the processes or functions described according to the embodiments of the present application are completely or partly generated. The computer may be a general-purpose computer, a special-purpose computer, a computer network or other programmable apparatus. The computer instructions may be stored in a computer-readable storage medium or transmitted from one computer-readable storage medium to another computer-readable storage medium. For example, the computer instructions may be transmitted from a web site, a computer, a server or a data center to another web site, computer, server or data center in a wired mode (for example, a coaxial cable, an optical fiber, a digital subscriber line (DSL)) or a wireless mode (for example, infrared, radio, microwave or the like). The computer-readable storage medium may be any available medium capable of being accessed by a computer or a data storage device including a server, a data center or the like integrated by one or more available media. The available medium may be a magnetic medium (for example, a soft disk, a hard disk, a magnetic tape), an optical medium (for example, a digital video disc (DVD)), or a semiconductor medium (for example, a solid state disk (SSD)) or the like.

Those of ordinary skill in the art may be aware that, units and algorithm steps of the examples described in the embodiments disclosed in the text can be implemented by electronic hardware, or a combination of computer software and electronic hardware. Whether these functions are performed by hardware or software depends on particular applications and designed constraint conditions of the technical solutions. Persons skilled in the art may use different methods to implement the described functions for every particular application, but it should not be considered that such implementation goes beyond the scope of the present application.

In the several embodiments provided in the present application, it should be understood that, the disclosed system, apparatus and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate components may or may not be physically separate, and components displayed as units may or may not be physical units, may be located in one position, or may be distributed on multiple network units. Some or all of the units may be selected according to actual requirements to achieve the objectives of the solutions of the embodiments.

In addition, functional units in the embodiments of this application may be integrated into one processing unit, or each of the units may exist alone physically, or two or more units are integrated into one unit.

The foregoing descriptions are merely specific embodiments of the present application, but the protection scope of the present application is not limited thereto, persons skilled in the art who are familiar with the art could readily think of variations or substitutions within the technical scope disclosed by the present application, and these variations or substitutions shall fall within the protection scope of the present application. Therefore, the protection scope of the present application shall be subject to the protection scope of the claims.

What is claimed is:

1. A device for three-dimensional (3D) printing, comprising:
a feeding pipe, wherein an opening extending along an axial direction of the feeding pipe is disposed on an outer wall of the feeding pipe; and
a sleeve sleeved on the feeding pipe, wherein a discharge port in communication with the opening is disposed on an outer wall of the sleeve, the sleeve is capable of rotating around an axis of the feeding pipe relative to the feeding pipe, so as to make the discharge port and the opening communicated or no longer communicated;
wherein a passage of the discharge port is a structure in which a section along material outflow direction gradually shrinks to a required size of the discharge port, the discharge port is a discharge port with a continuously adjustable size, and the discharge port performs a continuous printing along a cross-sectional contour line of a target printing region, and the outer wall of the sleeve comprises a first portion and a second portion, the first portion and the second portion are slidable relative to each other along the axial direction to adjust a length of the discharge port.

2. The device according to claim 1, wherein the sleeve is capable of rotating around the axis of the feeding pipe relative to the feeding pipe, so as to make the discharge port no longer be in communication with the opening when printing is required to be suspended.

3. The device according to claim 2, further comprising:
a first drive apparatus configured to drive the sleeve to rotate around the axis of the feeding pipe relative to the feeding pipe when printing is required to be suspended, so as to make the discharge port no longer be in communication with the opening.

4. The device according to claim 3, further comprising:
a control apparatus configured to control a drive apparatus in the device.

5. The device according to claim 1, further comprising:
a first drive apparatus configured to drive the sleeve to rotate around the axis of the feeding pipe relative to the feeding pipe when printing is required to be started, so as to make the discharge port be in communication with the opening.

6. The device according to claim 1, wherein the passage of the discharge port is a structure in which the section along material outflow direction gradually shrinks to a required width of the discharge port.

7. The device according to claim 6, wherein a section of the passage of the discharge port in a length direction is a stepped flow passage section or a streamlined flow passage section.

8. The device according to claim 1, wherein abutting faces between the first portion and the second portion have a stepped structure along material outflow direction to make a passage of the discharge port be a structure in which a section along material outflow direction gradually shrinks to a required size of the discharge port.

9. A control method of a device for 3D printing, wherein the device for 3D printing comprises:

a feeding pipe, wherein an opening extending along an axial direction of the feeding pipe is disposed on an outer wall of the feeding pipe; and a sleeve sleeved on the feeding pipe, wherein a discharge port in communication with the opening is disposed on an outer wall of the sleeve, the sleeve is capable of rotating around an axis of the feeding pipe relative to the feeding pipe;

wherein a passage of the discharge port is a structure in which a section along material outflow direction gradually shrinks to a required size of the discharge port, the discharge port is a discharge port with a continuously adjustable size, and the discharge port performs a continuous printing along a cross-sectional contour line of a target printing region, and the outer wall of the sleeve comprises a first portion and a second portion, the first portion and the second portion are slidable relative to each other along the axial direction to adjust a length of the discharge port;

wherein the control method comprises:

controlling the sleeve to rotate around the axis of the feeding pipe relative to the feeding pipe, so as to make the discharge port and the opening communicated or no longer communicated.

10. The control method according to claim 9, wherein the controlling the sleeve to rotate around the axis of the feeding pipe relative to the feeding pipe comprises:

controlling the sleeve to rotate around the axis of the feeding pipe relative to the feeding pipe when printing is required to be suspended, so as to make the discharge port no longer be in communication with the opening to block a material conveying passage.

11. The control method according to claim 9, wherein the controlling the sleeve to rotate around the axis of the feeding pipe relative to the feeding pipe comprises:

controlling the sleeve to rotate around the axis of the feeding pipe relative to the feeding pipe when printing is required to be started, so as to make the discharge port be in communication with the opening to open a material conveying passage.

\* \* \* \* \*